(12) United States Patent
Gaillardetz et al.

(10) Patent No.: US 11,429,632 B2
(45) Date of Patent: *Aug. 30, 2022

(54) DATA VALIDATION AND/OR DATA CONVERSION USING SMART CONTRACTS IN DISTRIBUTED LEDGER SYSTEMS

(71) Applicant: Optum, Inc., Minnetonka, MN (US)

(72) Inventors: Brian T. Gaillardetz, Minnetonka, MN (US); Maxwell Galat, Minnetonka, MN (US); Vatsal Shah, Minnetonka, MN (US); Daniel Smith, Minnetonka, MN (US); Soleh Udin Al Ayubi, Minnetonka, MN (US)

(73) Assignee: Optum, Inc., Minnetonka, MN (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/072,177

(22) Filed: Oct. 16, 2020

(65) Prior Publication Data

US 2021/0034639 A1 Feb. 4, 2021

Related U.S. Application Data

(63) Continuation of application No. 16/216,303, filed on Dec. 11, 2018, now Pat. No. 10,846,299.

(51) Int. Cl.
| | |
|---|---|
| *G06F 17/30* | (2006.01) |
| *G06F 16/25* | (2019.01) |
| *H04L 9/06* | (2006.01) |
| *G06F 16/18* | (2019.01) |
| *G06F 21/64* | (2013.01) |
| *G06F 16/215* | (2019.01) |
| *H04L 9/00* | (2022.01) |

(52) U.S. Cl.
CPC ........ *G06F 16/258* (2019.01); *G06F 16/1805* (2019.01); *G06F 16/215* (2019.01); *G06F 21/64* (2013.01); *H04L 9/0643* (2013.01); *H04L 9/50* (2022.05)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 6,581,093 B1 | 6/2003 | Verma | |
| 7,617,491 B1 * | 11/2009 | Nedderman | ............ H04L 67/42 |
| | | | 717/136 |
| 7,895,441 B2 * | 2/2011 | Parkinson | ............. H04L 9/3236 |
| | | | 713/168 |

(Continued)

OTHER PUBLICATIONS

U.S. Appl. No. 16/216,303, filed Dec. 11, 2018, 2020/0183950, Allowed.

(Continued)

*Primary Examiner* — Hung D Le
(74) *Attorney, Agent, or Firm* — Alston & Bird LLP

(57) ABSTRACT

Computer program products, methods, systems, apparatus, and computing entities are provided for automatically validating and/or converting data in candidate transaction in a distributed ledger systems. The validating and converting can be automatically executed via one or more smart contracts. Once validated and/or converted the candidate transaction may be committed to a ledger in the distributed ledger system.

15 Claims, 15 Drawing Sheets

(56) References Cited

U.S. PATENT DOCUMENTS

| | | | |
|---|---|---|---|
| 7,984,490 B2* | 7/2011 | Parkinson | H04L 9/3247 726/5 |
| 8,131,692 B2 | 3/2012 | Daniello et al. | |
| 8,205,254 B2 | 6/2012 | Aschen et al. | |
| 8,615,578 B2 | 12/2013 | Hu et al. | |
| 8,635,238 B2 | 1/2014 | Tisi et al. | |
| 2005/0050076 A1 | 3/2005 | Tong et al. | |
| 2007/0019561 A1 | 1/2007 | Peterson | |
| 2009/0271300 A1 | 10/2009 | Mundy | |
| 2010/0268616 A1 | 10/2010 | Tisi et al. | |
| 2016/0071226 A1 | 3/2016 | Karale et al. | |
| 2016/0299918 A1 | 10/2016 | Ford | |
| 2019/0370250 A1* | 12/2019 | Tipton | G06F 16/9027 |
| 2020/0067697 A1* | 2/2020 | Puddu | G06F 21/602 |
| 2020/0134719 A1* | 4/2020 | Malik | H04L 9/3239 |
| 2020/0143267 A1* | 5/2020 | Gidney | G06N 3/006 |

OTHER PUBLICATIONS

"My Healthcare in My Hands—A User-Centric Approach to Making Medical Records Accessible on Blockchain," Health Wizz Inc., pp. 1-17. [Retrieved From the Internet Sep. 26, 2019] <https://blockchain.ieee.org/images/files/images/clinicaltrialsforum-2018/healthwizz_white_paper.pdf>.

Anadiotis George. "Conway's Law and the Future of Healthcare Data Management: Genome, Blockchain, and GDPR," ZDNet, Apr. 11, 2018, (20 pages). [Retrieved From the Internet Sep. 26, 2019] <https://www.zdnet.com/article/conways-law-and-healthcare-data-management-genome-data-blockchain-and-gdpr/>.

HL7 Fast Healthcare Interoperability Resources Specification (FHIR®), DSTU Release 1, (6 pages). [Retrieved From the Internet Sep. 26, 2019] <http://www.hl7.org/implement/standards/product_brief.cfm?product_id=343>.

Notice of Allowance and Fee(s) Due for U.S. Appl. No. 16/216,303, filed Jul. 13, 2020, (9 pages), United States Patent and Trademark Office, U.S.

Overview of Health Care Data Standards. Commissioned Paper for Institute of Medicine (IOM) Committee on Data Standards for Patient Safety, NCBI Bookshelf (2004), pp. 1-30. [Retrieved From the Internet] <https://www.ncbi.nlm.nih.gov/books/NBK216088/?report=printable>.

Zhamg Peng et al. "FHIRChain: Applying Blockchain to Securely and Scalably Share Clinical Data," The Journal of Network and Computer Applications, Jan. 1, 2018, pp. 1-30.

Zhang Peng, et al. "Design of Blockchain-Based Apps Using Familiar Software Patterns to Address Interoperability Challenges in Healthcare," In PLoP-24th Conference on Pattern Languages of Programs 2017, pp. 1-14.

* cited by examiner

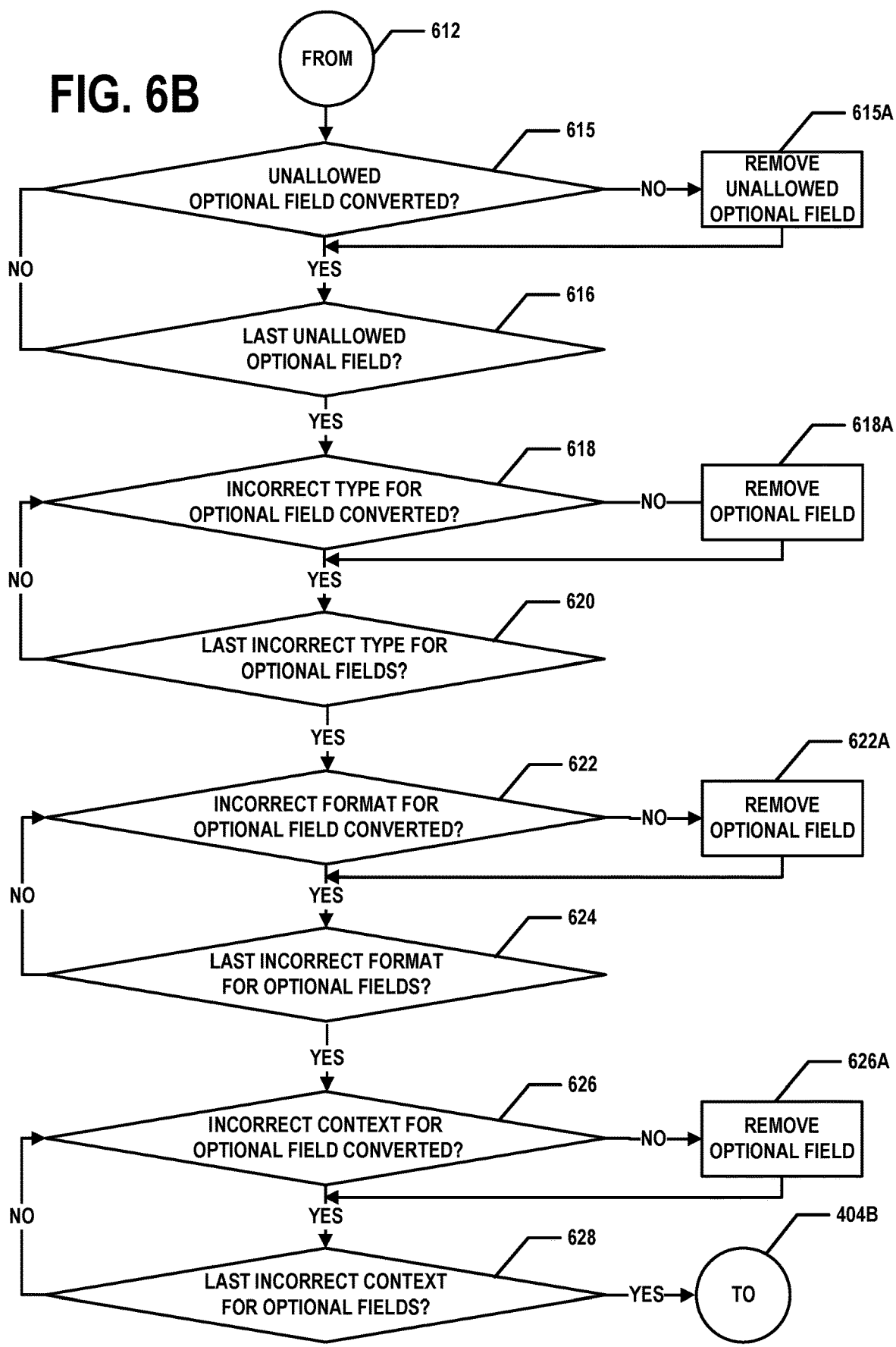

DATA VALIDATION AND/OR DATA CONVERSION USING SMART CONTRACTS IN DISTRIBUTED LEDGER SYSTEMS

CROSS-REFERENCE TO RELATED APPLICATIONS

This application is a continuation of U.S. application Ser. No. 16/216,303 filed Dec. 11, 2018, which is hereby incorporated herein in its entirety by reference.

TECHNICAL FIELD

Various embodiments relate generally to distributed ledgers and processes for data validation and/or data conversion in distributed ledger systems.

BACKGROUND

Distributed ledger systems are implemented in a distributed fashion and often without a central authority. Moreover, applications within distributed ledger systems interface with various systems, entities, and applications. Because of the interaction with such systems, entities, and applications and in order to ensure the integrity of the data stored by a distributed ledger, there is a latent need for a rigorous methodology for validating data and/or converting data into a single data standard in distributed ledger systems. Through applied effort, ingenuity, and innovation, the inventors have developed methods, apparatus, systems, computing devices, computing entities, and/or the like for the same—embodiments of which are detail herein.

BRIEF SUMMARY

In general, embodiments of the present invention provide methods, apparatus, systems, computing devices, computing entities, and/or the like.

In accordance with one aspect, a method is provided. In one embodiment, the method comprises receiving, by a node computing entity in the distributed ledger system, a request to commit a candidate transaction to a distributed ledger in the distributed ledger system; responsive receiving the candidate transaction, automatically executing, by the node computing entity in the distributed ledger system, a validation smart contract to validate at least a portion of the data in the candidate transaction, wherein (1) the candidate transaction comprises a first data field, (2) the first data field is of a first data type, (3) validating the at least the portion of the data in the candidate transaction comprises determining whether the first data type is a required data type, (4) the required data type is a second data type, and (5) a data standard defines the required data type; responsive to determining that the first data type is not the required data type, flagging, by the node computing entity in the distributed ledger system, the (1) first data field as invalid, (2) candidate transaction as invalid, or (3) both; and automatically executing, by the node computing entity in the distributed ledger system, a conversion smart contract to convert the first data type to the second data type.

In accordance with another aspect, a computer program product is provided. The computer program product may comprise at least one computer-readable storage medium having computer-readable program code portions stored therein, the computer-readable program code portions comprising executable portions configured to receive a request to commit a candidate transaction to a distributed ledger in the distributed ledger system; responsive receiving the candidate transaction, automatically execute a validation smart contract to validate at least a portion of the data in the candidate transaction, wherein (1) the candidate transaction comprises a first data field, (2) the first data field is of a first data type, (3) validating the at least the portion of the data in the candidate transaction comprises determining whether the first data type is a required data type, (4) the required data type is a second data type, and (5) a data standard defines the required data type; responsive to determining that the first data type is not the required data type, flag the (1) first data field as invalid, (2) candidate transaction as invalid, or (3) both; and automatically execute a conversion smart contract to convert the first data type to the second data type.

In accordance with yet another aspect, a node comprising at least one processor and at least one memory including computer program code is provided. In one embodiment, the at least one memory and the computer program code may be configured to, with the processor, cause the node receive a request to commit a candidate transaction to a distributed ledger in the distributed ledger system; responsive receiving the candidate transaction, automatically execute a validation smart contract to validate at least a portion of the data in the candidate transaction, wherein (1) the candidate transaction comprises a first data field, (2) the first data field is of a first data type, (3) validating the at least the portion of the data in the candidate transaction comprises determining whether the first data type is a required data type, (4) the required data type is a second data type, and (5) a data standard defines the required data type; responsive to determining that the first data type is not the required data type, flag the (1) first data field as invalid, (2) candidate transaction as invalid, or (3) both; and automatically execute a conversion smart contract to convert the first data type to the second data type.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
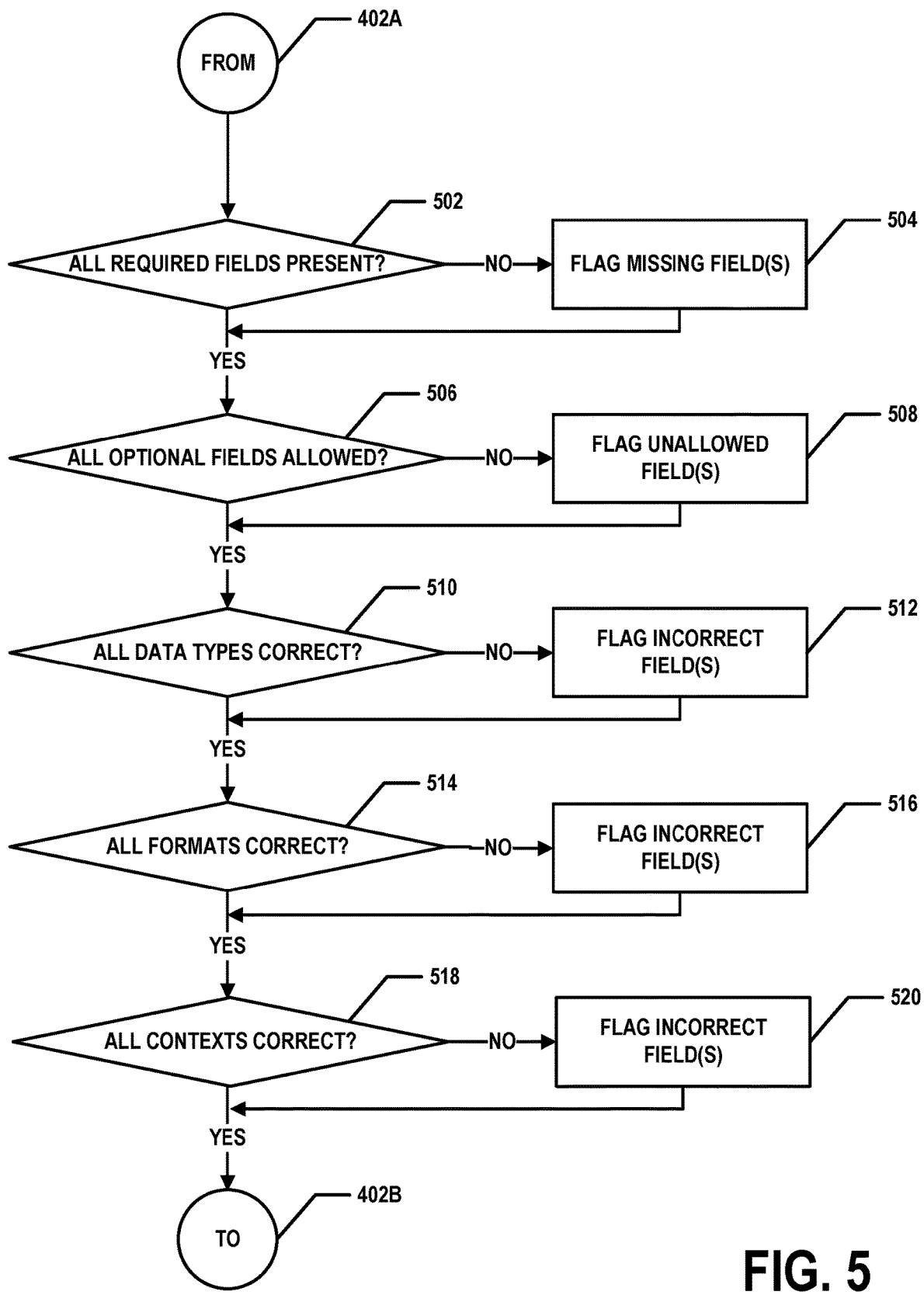
Figure 6A:
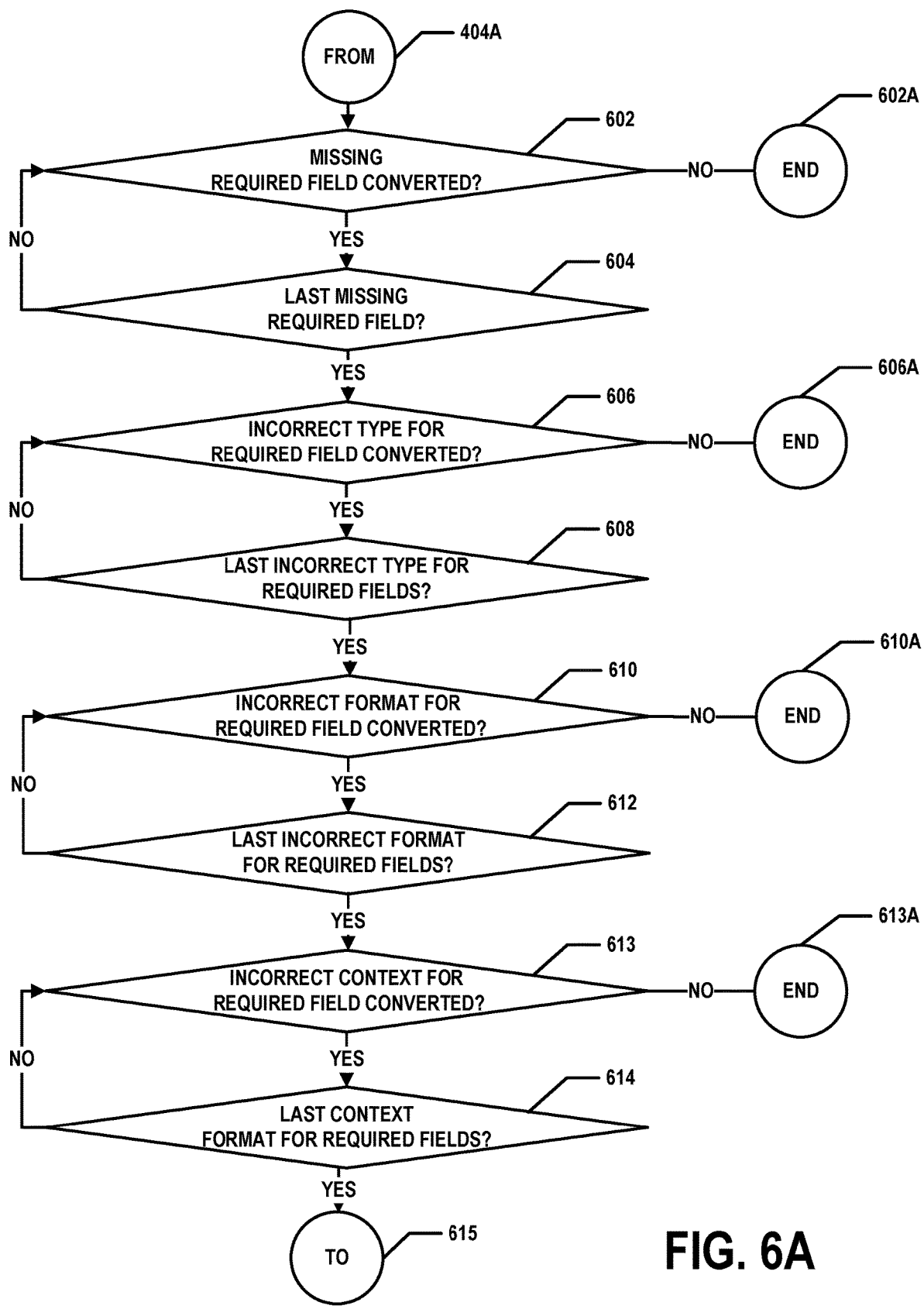
Figure 7:
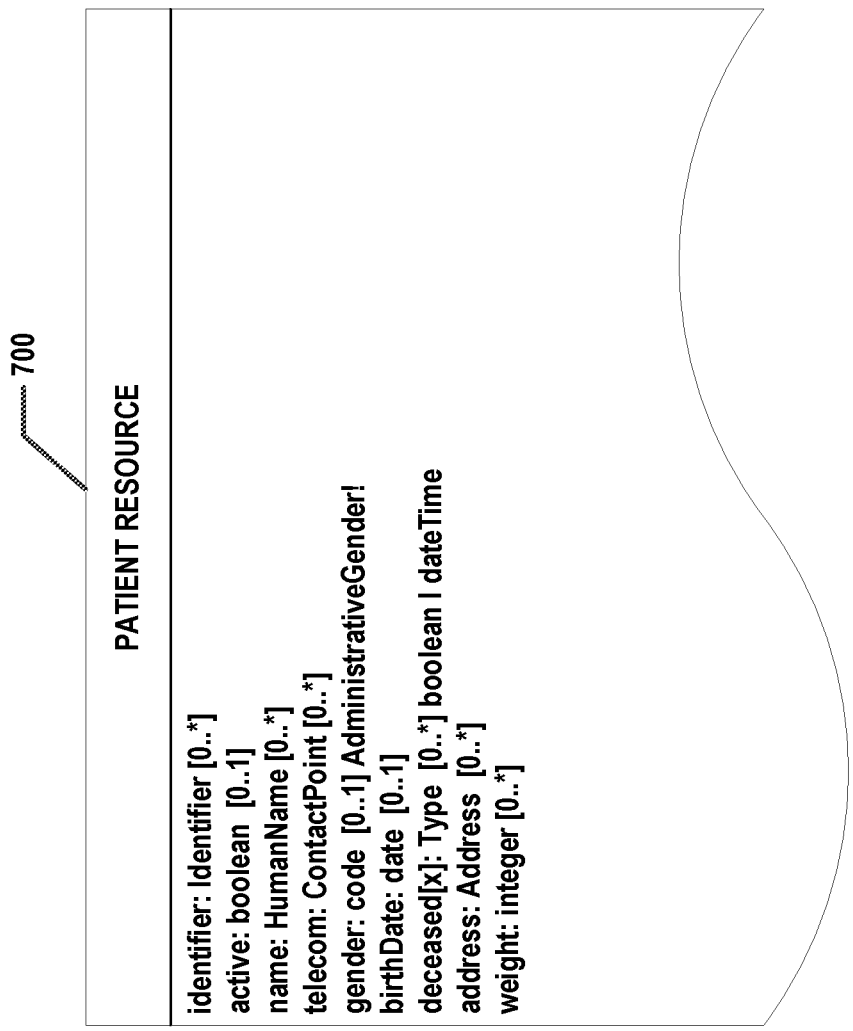
Figure 8:
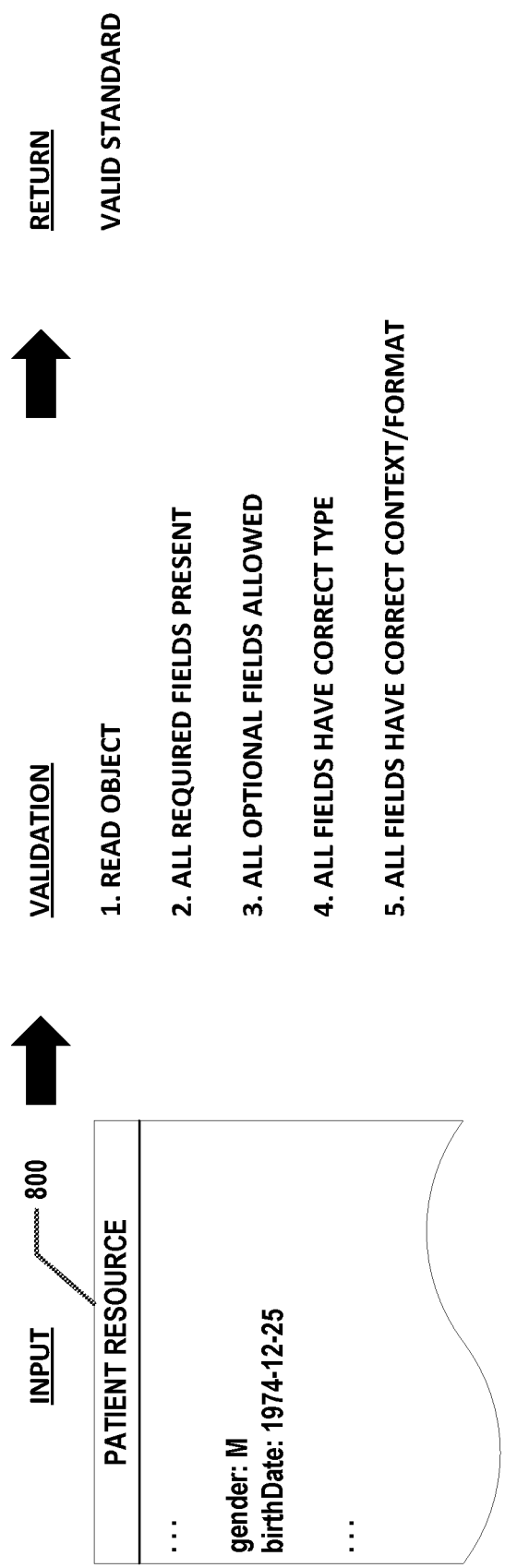
Figure 9:
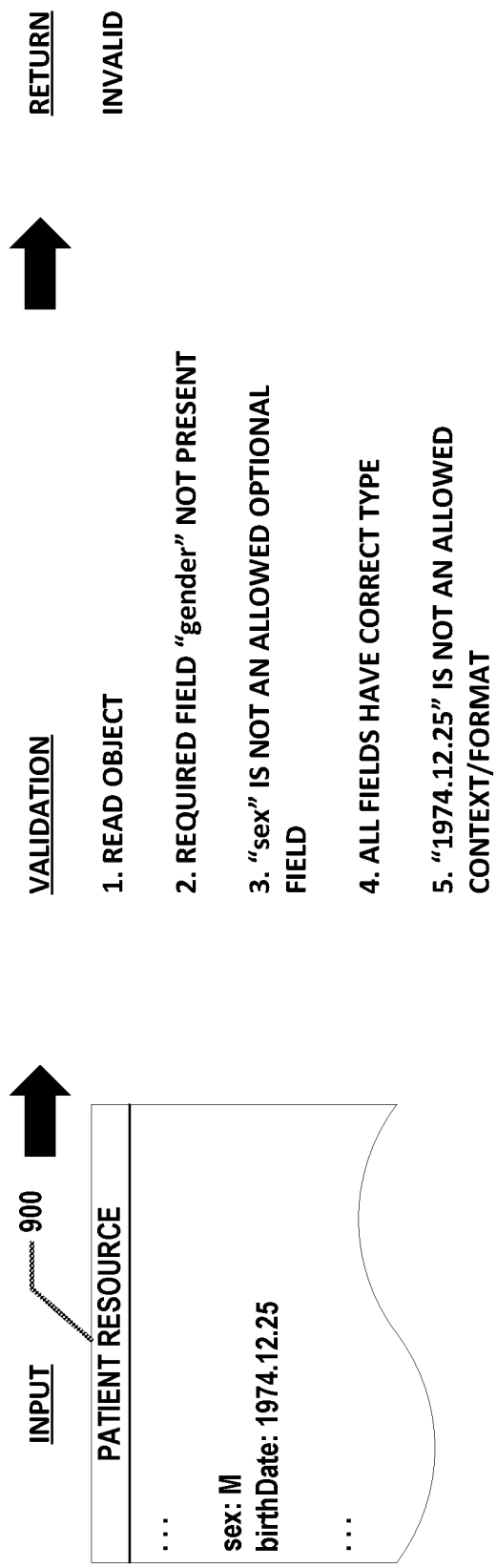
Figure 10:
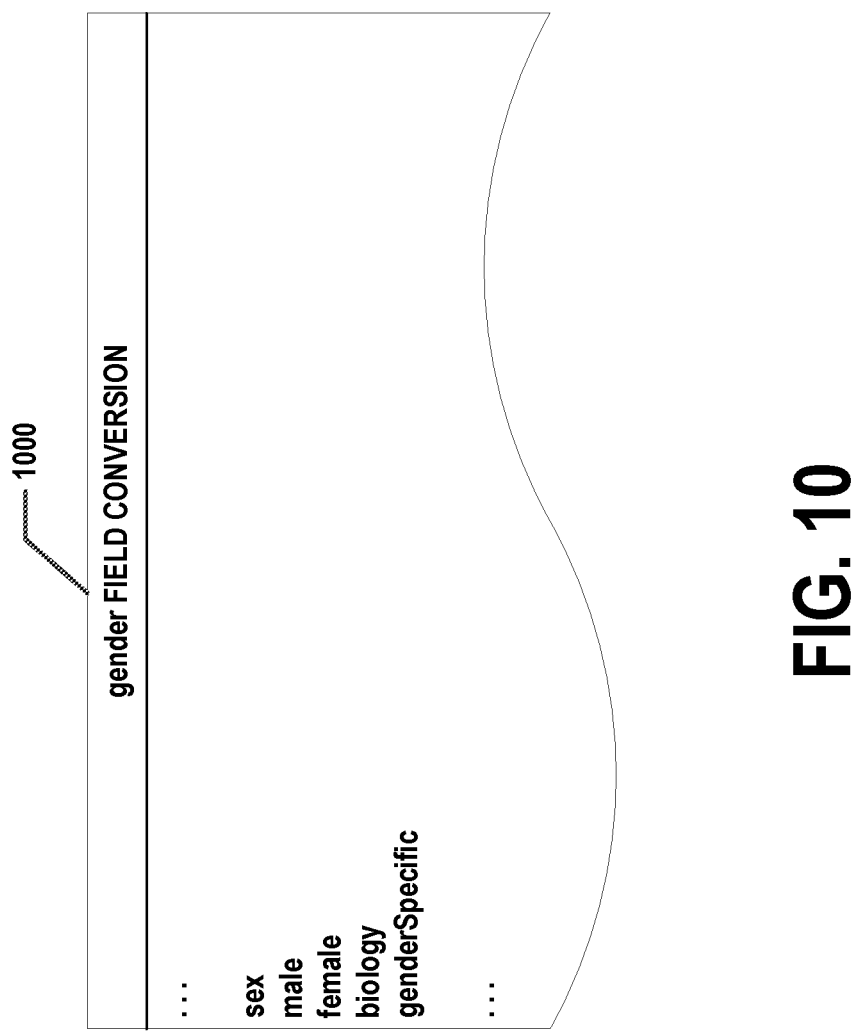
Figure 11:
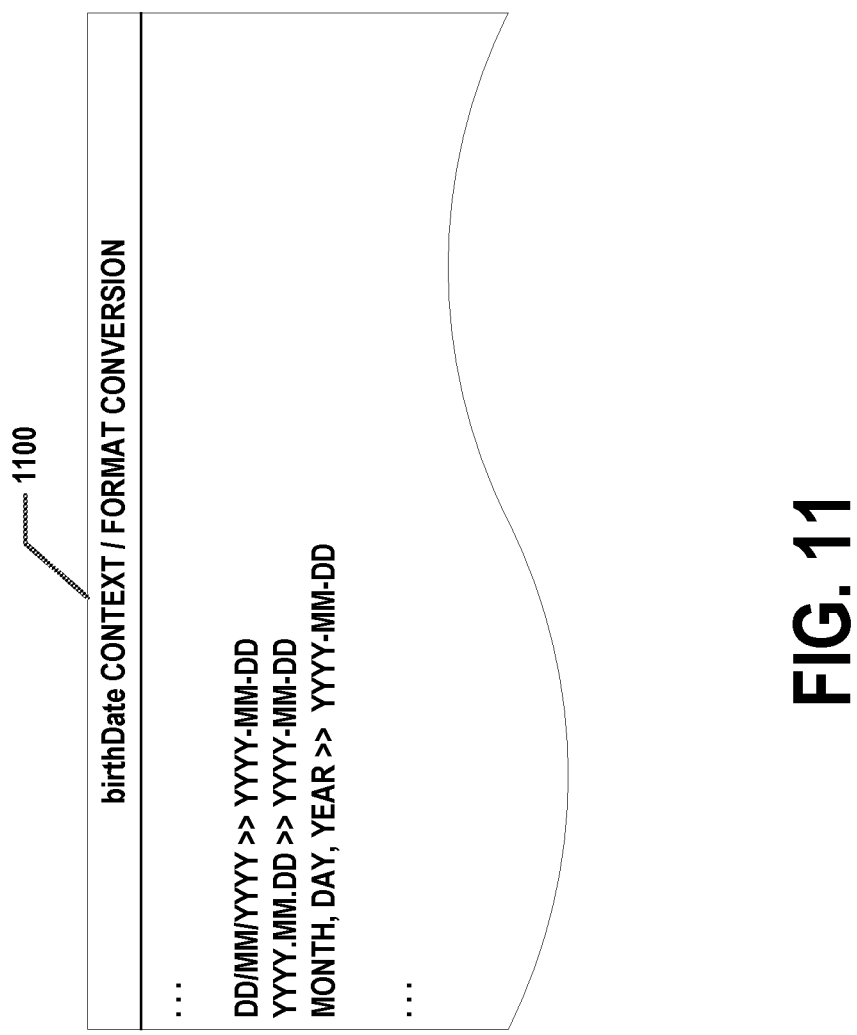
Figure 12:
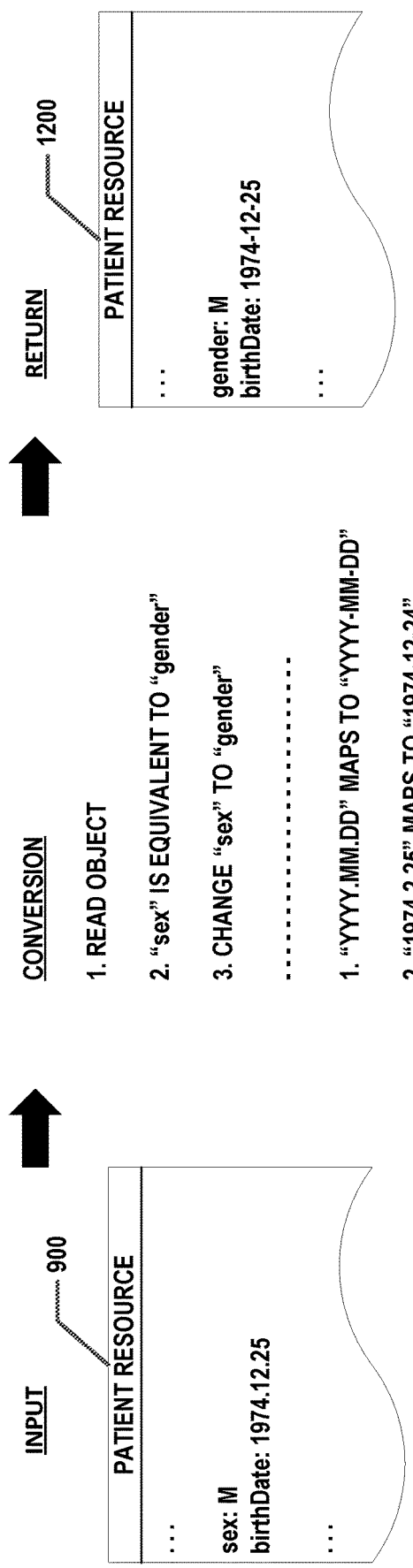

FIGS. 4A, 4B, 5, 6A, and 6B are flowcharts for exemplary operations, steps, and processes in accordance with certain embodiments of the present invention; and FIG. 7 is an exemplary patient resource record, in accordance with an example embodiment of the present invention;

FIGS. 8, 9, and 12 are exemplary inputs and outputs, in accordance with an example embodiment of the present invention;

FIG. 10 is an exemplary data field conversion object, in accordance with an example embodiment of the present invention; and FIG. 11 is an exemplary context/format conversion object, in accordance with an example embodiment of the present invention.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

Figure 1A:
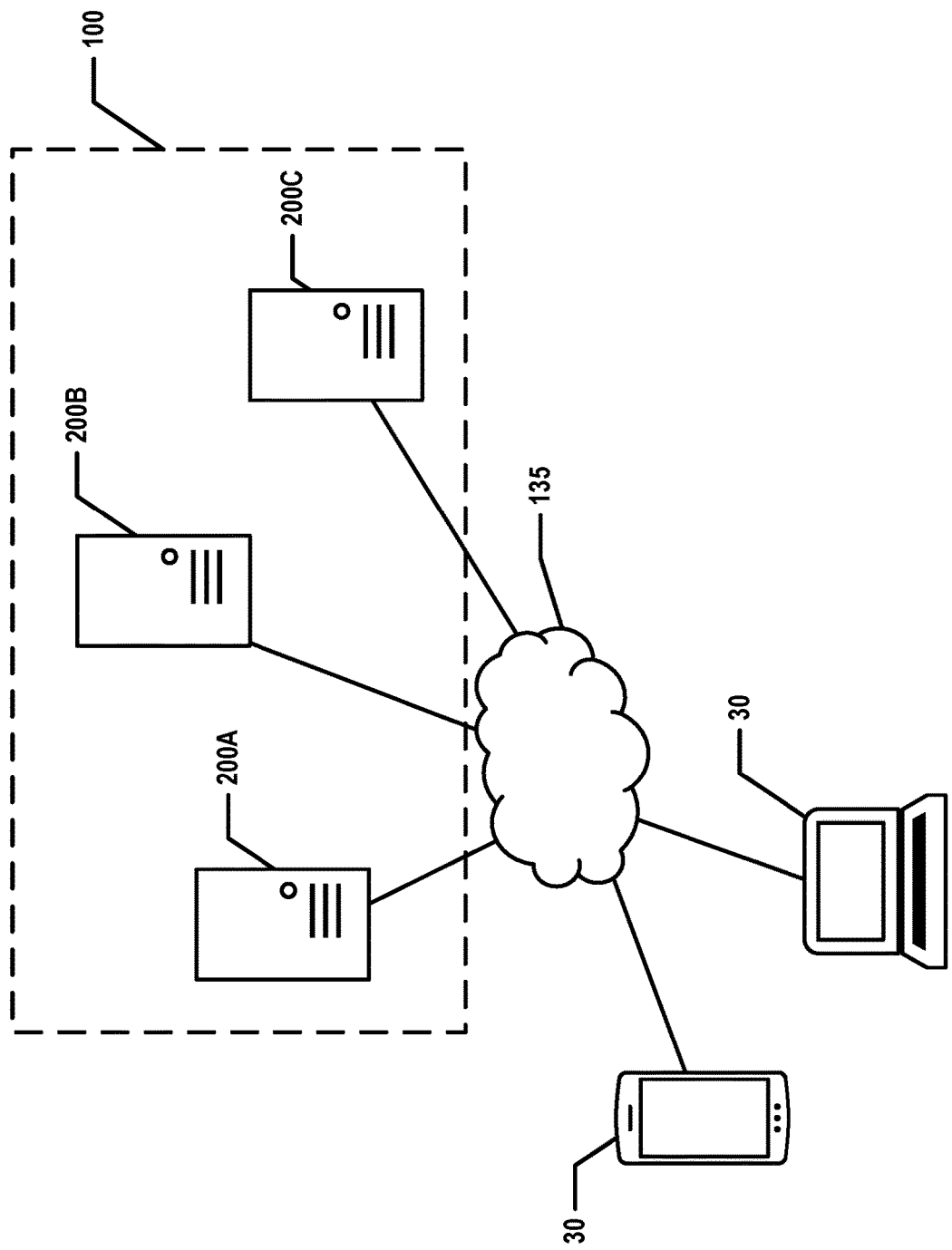
FIG. 1A is an exemplary diagram of a system that can be used to practice various embodiments of the present invention.
Figure 1B:
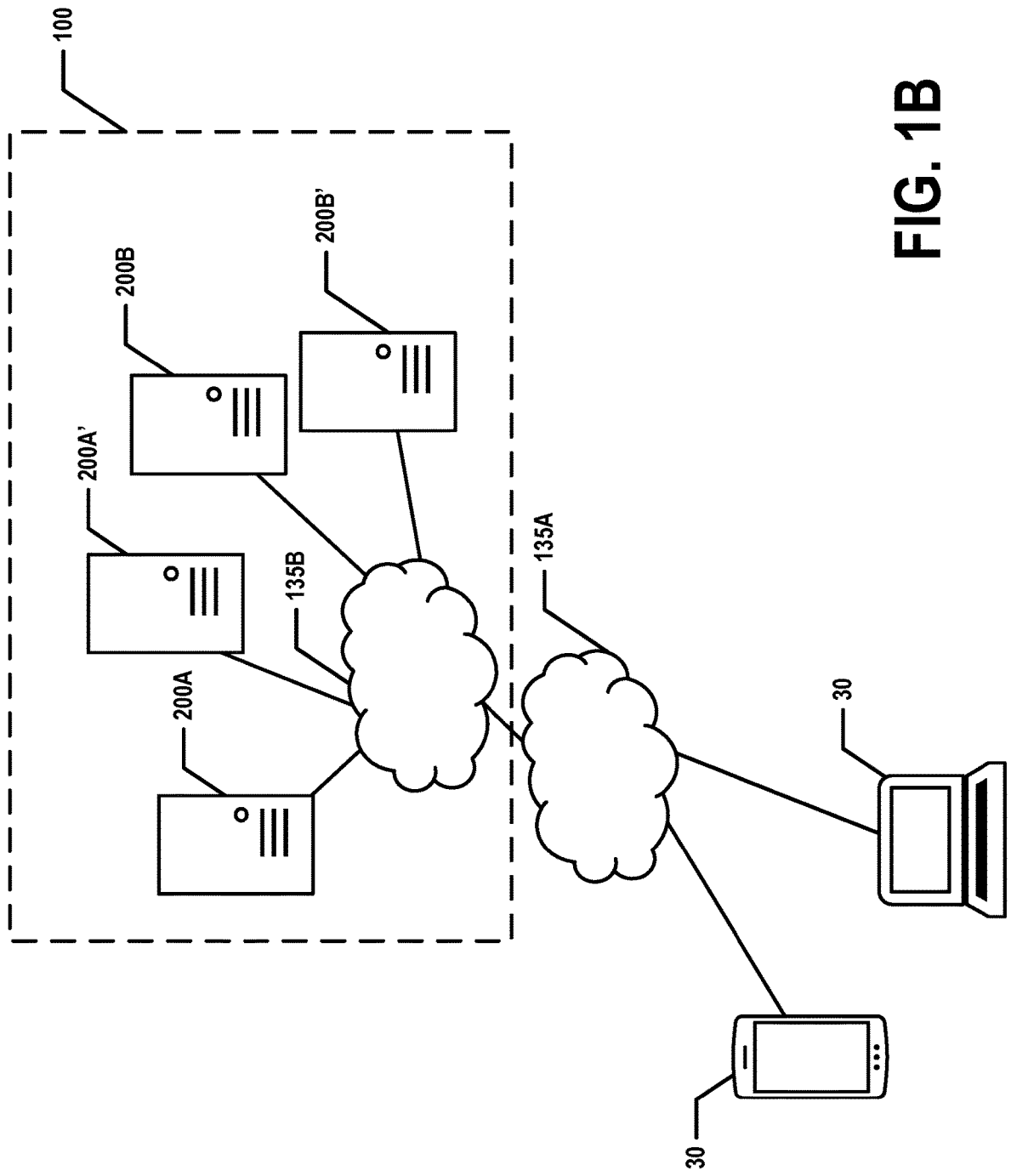
FIG. 1B is an exemplary diagram of another system that can be used to practice various embodiments of the present invention.

FIG. 1A provides an illustration of a system that can be used in conjunction with various embodiments of the present invention. As shown in FIG. 1A, the system may comprise a distributed platform 100 comprising two or more node computing entities 200 (e.g., 200A, 200B, 200C). As shown in FIG. 1A, the system may further comprise one or more non-node computing entities 30, one or more networks 135, and/or the like. FIG. 1B provides an illustration of another system that can be used in conjunction with various embodiments of the present invention. As shown in FIG. 1B, the system may comprise a distributed platform 100 comprising two or more node computing entities 200 (e.g., 200A, 200B), 200' (e.g., 200A', 200B'), one or more external networks 135A, and/or one or more internal networks 135B. For example, in an example embodiment, the distributed platform 100 comprises a plurality of node computing entities 200, 200' in communication with one another via a network 135B. The network 135B may be an internal or private network. As shown in FIG. 1B, the system may further comprise one or more non-node computing entities 30, one or more other and/or external networks 135A, and/or the like. For example, the other and/or external network 135A may be external, public, and/or a different network from the internal and/or private network 135B. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), or the like. Additionally, while FIGS. 1A and/or 1B illustrate certain system entities as separate, standalone entities, the various embodiments are not limited to this particular architecture.

a. Exemplary Node Computing Entity

Figure 2:
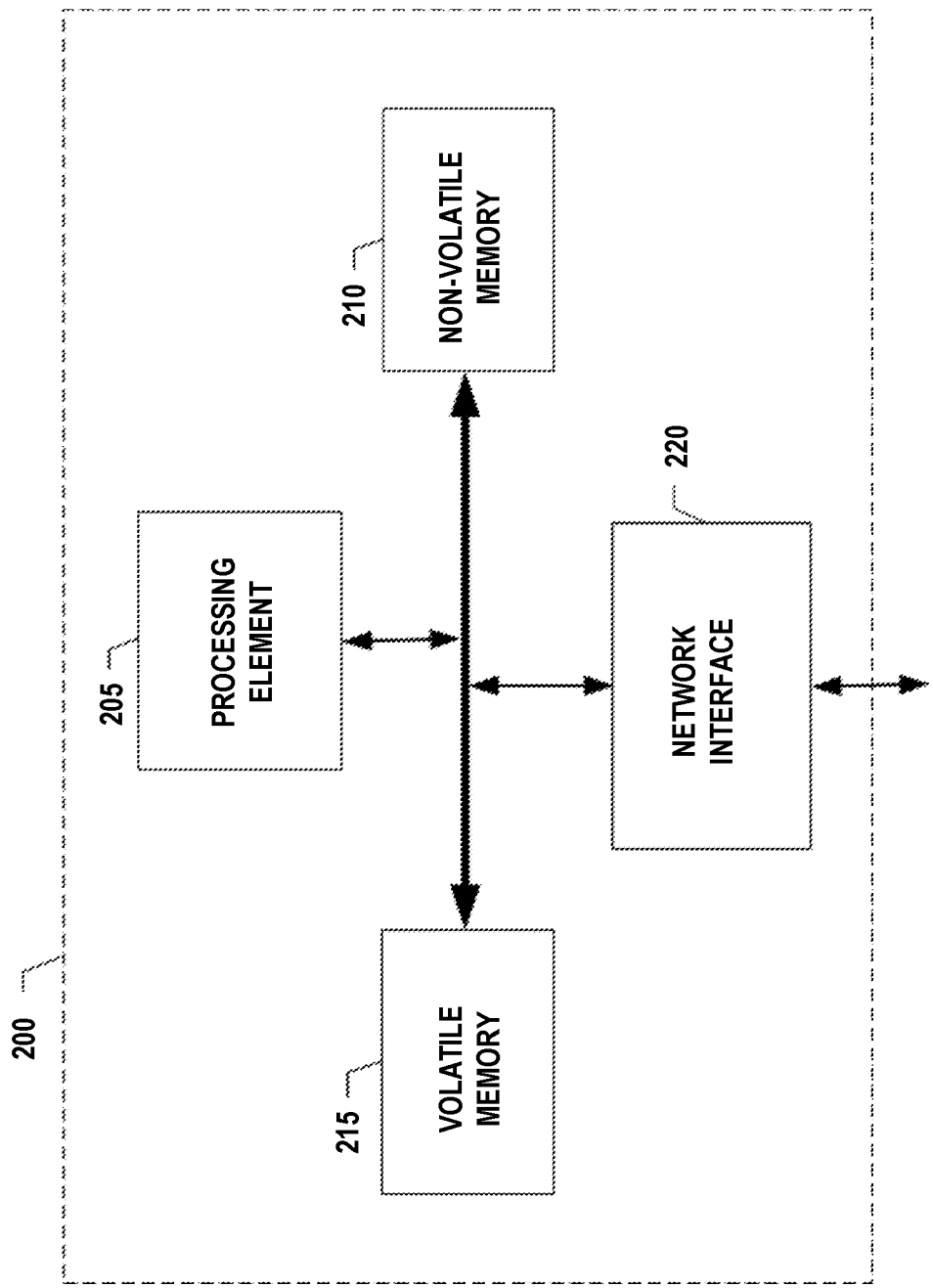
FIG. 2 is an exemplary schematic of a node computing entity in accordance with certain embodiments of the present invention.

FIG. 2 provides a schematic of a node computing entity 200 (e.g., 200A, 200B, 200C) according to one embodiment of the present invention. A node is an individual entity within a distributed ledger system, and can further described as a full node (e.g., stores the entire blockchain), a mining node (e.g., full node that also maintains the blockchain by publishing new blocks), a lightweight node (e.g., node that does not maintain a history of the entire blockchain), and/or the like. In general, the terms node computing entity, computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the node computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. For instance, the node computing entity 200 may communicate with other node computing entities 200, 200', one or more non-node computing entities 30, and/or the like.

As shown in FIG. 2, in one embodiment, the node computing entity 200 may include or be in communication with one or more processing elements 205 (also referred to as processors, processing circuitry, and/or similar terms used herein interchangeably) that communicate with other elements within the node computing entity 200 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the node computing entity 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the node computing entity 200 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205. Thus, the databases, database instances, database management system entities, data, applications, programs, program modules, scripts, source code, object code, byte code, compiled code, interpreted code, machine code, executable instructions, and/or the like may be used to control certain aspects of the operation of the node computing entity 200 with the assistance of the processing element 205 and operating system.

As indicated, in one embodiment, the node computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. For instance, the node computing entity 200 may communicate with computing entities or communication interfaces of other node computing entities 200, 200', and/or the like.

As indicated, in one embodiment, the node computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the node computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The node computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the node computing entity's 200 components may be located remotely from other node computing entity 200 components, such as in a distributed system. Furthermore, one or more of the components may be combined and additional components performing functions described herein may be included in the node computing entity 200. Thus, the node computing entity 200 can be adapted to accommodate a variety of needs and circumstances.

In example embodiments, the node computing entity 200 may be in communication with one or more other node computing entities 200, 200' and/or one or more non-node computing entities 30. In example embodiments, the node computing entity 200 may be in communication with one or more other node computing entities 200, 200' configured for providing events, consensus requests, and/or the like; performing consensus processing; storing a copy of a distributed ledger; and/or the like.

b. Another Exemplary Node Computing Entity

Figure 3:
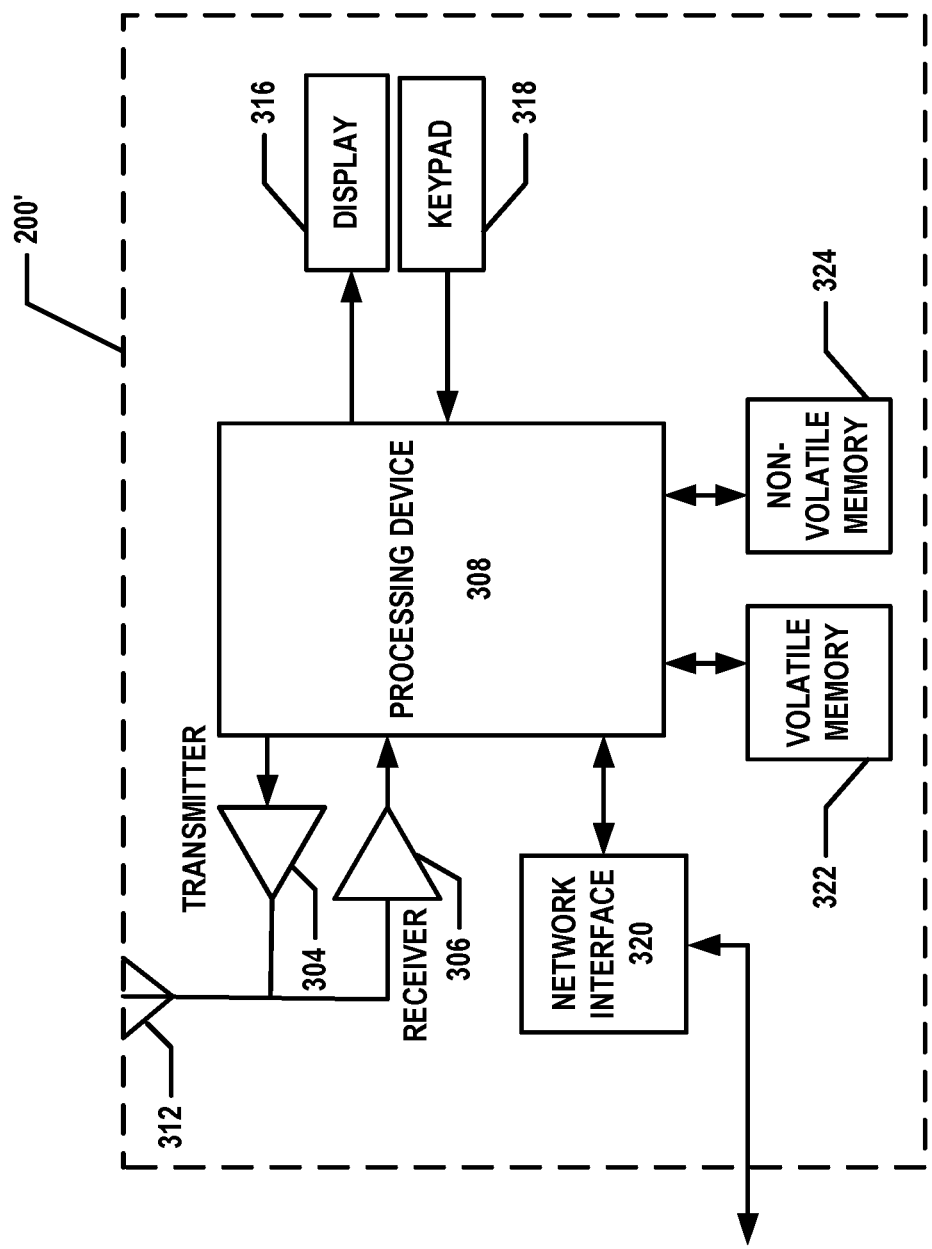
FIG. 3 is an exemplary schematic of another node computing entity in accordance with certain embodiments of the present invention.

FIG. 3 provides an illustrative schematic representative of another node computing entity 200' that can be used in conjunction with embodiments of the present invention. As shown in FIG. 3, a node computing entity 200' can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as another node computing entity 200, 200', one or more non-node computing entities 30, and/or the like. In this regard, the node computing entity 200' may be capable of operating with one or more air interface standards, communication protocols, modulation types, and access types.

More particularly, the node computing entity 200' may operate in accordance with any of a number of wireless communication standards and protocols. In a particular embodiment, the node computing device 200' may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the node computing entity 200' can communicate with various other entities using concepts such as Unstructured Supplementary Service information/data (USSD), Short Message Service (SMS), Multimedia Messaging Service (MIMS), Dual-Tone Multi-Frequency Signaling (DTMF), and/or Subscriber Identity Module Dialer (SIM dialer). The node computing entity 200' can also download changes, add-ons, and updates, for instance, to its firmware, software (e.g., including executable instructions, applications, program modules), and operating system.

According to one embodiment, the node computing entity 200' may include location determining aspects, devices, modules, functionalities, and/or similar words used herein interchangeably. For example, the node computing entity 200' may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the computing entity's 200' position in connection with a variety of other systems, including cellular towers, Wi-Fi access points, and/or the like. Similarly, the node computing entity 200' may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The node computing entity 200' may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the node computing entity 200' to cause display or audible presentation of information/data and for user interaction therewith via one or more user input interfaces. The user input interface can comprise any of a number of devices allowing the node computing entity 200' to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the node computing entity 200' and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the node computing entity 200' can collect information/data, user interaction/input, and/or the like.

The node computing entity 200' can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the node computing entity 200'.

In example embodiments, the node computing entity 200 may be in communication with one or more other node computing entities 200, 200' and/or one or more non-node computing entities 30. In example embodiments, the node computing entity 200 may be in communication with one or more other node computing entities 200, 200' configured for providing events, consensus requests, and/or the like; performing consensus processing; storing a copy of a distributed ledger; and/or the like.

c. Exemplary Non-Node Computing Entity

In an example embodiment, a non-node computing entity 30 may be a computing entity configured for user interaction (e.g., via one or more user interface devices thereof) for receiving, generating, and/or providing events and/or information related thereto and/or communicating with node computing entities 200, 200'. In various embodiments, a user may be a person interacting with a non-node computing entity 30 (e.g., via the user interface devices thereof) or a machine user (e.g., an application, service, and/or the like operating on the non-node computing entity 30). In various embodiments, the non-node computing entity 30 may be a computing entity external to the distributed ledger.

In an example embodiment, a non-node computing entity 30 may be in communication with one or more node computing entities 200, 200' via one or more wired or wireless networks 135. In one embodiment, the non-node computing entity 30 may include one or more components that are functionally similar to those of a node computing entity 200, 200'. For example, in one embodiment, a non-node computing entity 30 may include: (1) a processing element that communicates with other elements via a system interface or bus; (2) one or more user interface devices (e.g., display, touchscreen display, hard or soft keyboard, mouse, and/or the like); (3) transitory and non-transitory memory;

and (4) a network and/or communications interface configured to communicate via one or more wired or wireless networks 135. For example, the non-node computing entity 30 may receive user input (e.g., via the user input interface thereof) and provide (e.g. transmit) an indication of the user input to one or more node computing entities 200, 200' (e.g., via the network and/or communications interface).

d. Exemplary Networks

In one embodiment, any two or more of the illustrative components of the architecture of FIGS. 1A and/or 1B may be configured to communicate with one another via respective communicative couplings to one or more networks 135. The networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. BRIEF OVERVIEW OF TECHNICAL CHALLENGES AND TECHNICAL SOLUTION

Embodiments of the present invention present technical solutions to various technical challenges.

a. Technical Challenges

In the healthcare domain, there are various standards for organizing, exchanging, representing, and encoding healthcare information/data so that the information/data can be understood and accepted by disparate systems. For example, Health Level Seven International (HL7) standards, Fast Healthcare Interoperability Resources (FHIR) standards, and various standards are just a few of the standards currently used in the healthcare domain. In distributed ledger systems, the use of different information/data standards is technically challenging as information/data in a transaction needs to be validated before it is committed to a ledger. Thus, to ensure data integrity and interoperability, information/data stored in a distributed ledger should to be in a single information/data standard. And as will be recognized, while embodiments of the present invention are described in the healthcare context, they are not so limited and extend to virtually any domain in which information/data standards and distributed ledgers are used. For example, in the financial services context, standards such as the Business Identifier Code (BIC), International the Bank Account Number (MAN), and the Market Identifier Code (MIC) are used. And in various other contexts, a variety of other information/data standards are used. Embodiments of the present invention extend equally to these and various other domains.

To overcome these technical challenges, existing approaches are insufficient. For instance, in one approach, all parties are required to ensure that information/data for a transaction complies with a particular information/data standard. This approach is not ideal as it requires all parties to use the same standard, use the same version of the standard, and have the same interpretation of the standard. This approach also lacks the ability to confirm that all contributing parties accurately validated the committed information/data. As another approach, front end logic is used to enforce an information/data, but this approach lacks shared logic across applications and there is no record of validations having occurred. As another approach, Application Programming Interfaces (APIs) validate and convert information/data before committing a transaction. However, APIs can be central points of failure and may not provide the needed visibility into the validation and conversion logic. Similarly, the use of APIs may open the system to various security vulnerabilities.

b. Technical Solution

To overcome at least these technical challenges, embodiments of the present invention provide a technical solution by implementing information/data validation and/or information/data conversion using one or more self-executing smart contracts distributed throughout a distributed ledger system. In embodiments of the present invention, one or more smart contracts validate information/data in a candidate transaction and convert the information/data if necessary. In this approach, the one or more smart contracts ensure that all transaction records committed to the ledger are in proper information/data standard (e.g., FHIR). By executing such smart contracts within the distributed ledger system, a record of the validation and conversion can be verified and attested to by all parties. This approach also eliminates the need for duplicate work to adapt to changes in information/data, provides the ability for parties to collaborate together, and efficiently implement updates to information/data standards when consensus on new logic is achieved.

IV. EXEMPLARY SYSTEM OPERATION

Reference will now be made to FIGS. 4A, 4B, 5, 6A, 6B, and 7-12. FIGS. 4A, 4B, 5, 6A, and 6B are flowcharts for exemplary operations, steps, and processes. FIG. 7 is an exemplary patient resource record. FIGS. 8, 9, and 12 are exemplary inputs and outputs. FIG. 10 is an exemplary required data field conversion object. And FIG. 11 is an exemplary context/format conversion object.

Information/data standards (e.g., FHIR) define the characteristics of the information/data. For example, the information/data standard may define required data fields for all transactions or specific transactions based on transaction types. In one embodiment, FIG. 7 shows fields that may be required to be a valid patient resource record (e.g., required data fields) in accordance with an FHIR standard: identifier, active, name, gender, birthDate, deceased, address, and/or the like. The information/data standard may also define optional data fields for all transactions or specific transactions based on transaction types. FIG. 7 also shows a field that may be optional in a valid patent resource record (e.g., optional data field) in accordance with an FHIR standard: telecom. Further, the information/data standard may define the data types, data sizes, and data ranges of input allowed for required data fields and/or optional data fields. For example, an input type may be required to be an integer, longinteger, real, singlereal, currency, date, datetime, time, timespan, boolean, string, binary, and/or the like. The input size of a string may be limited to 15 characters. And the input range an integer may be required to be in the domain of [0,10000]. Still further, the information/data standard may define the information/data context or information/data format of input allowed for required data fields and/or optional data fields. For instance, dates may have to follow the "YYYY-MM-DD" format, weight may need to be in pounds or kilograms, states or provinces should be spelled out or abbreviated, and/or the like. As will be recognized, various information/data standards can be enforced to adapt to a variety of needs and circumstances.

In one embodiment, information/data standards can be enforced in a blockchain system or distributed ledger system. A blockchain system is particular implementation of a distributed ledger system (DLS)—both terms are used herein interchangeably. Thus, while embodiments of the present invention are described in a blockchain system, they are equally applicable to any DLS. In blockchain systems, blocks of information/data are stored simultaneously in multiple node computing entities 200, 200'. The information/data may be in the form of static or dynamic information/data. The information/data may be referred to as information/data, transactions, information/data transactions, resources, information/data resources, and/or similar words used herein interchangeably. In one embodiment, information/data may need to be validated and/or converted for storage in a blockchain node computing entity 200, 200'.

In one embodiment, the process may begin when a candidate transaction is submitted by a non-node computing entity 30 to a node computing entity 200, 200'. Candidate transactions are propagated to the node computing entities 200, 200' in the network while they wait in a queue or transaction pool to be committed to a block. Because a block only contains validated transactions, node computing entities 200, 200' need to ensure the validity of the candidate transactions before committing them a block. In other words, a candidate transaction may comprise information/data that needs to be validated with regard to a particular information/data standard—in addition to ensuring the validity of transaction itself. In a particular example, FIGS. 8 and 9 show an exemplary candidate transactions (e.g., patient resource records 800, 900) that may be submitted for commission to a blockchain. In this example, the candidate transaction may be a transaction to store a new patient record, update an existing patient record, record an event associated with an existing patient record, and/or the like. As previously noted, the examples herein are to aid in understanding embodiments of the present invention and should not be construed in a limiting manner.

Figure 4A:
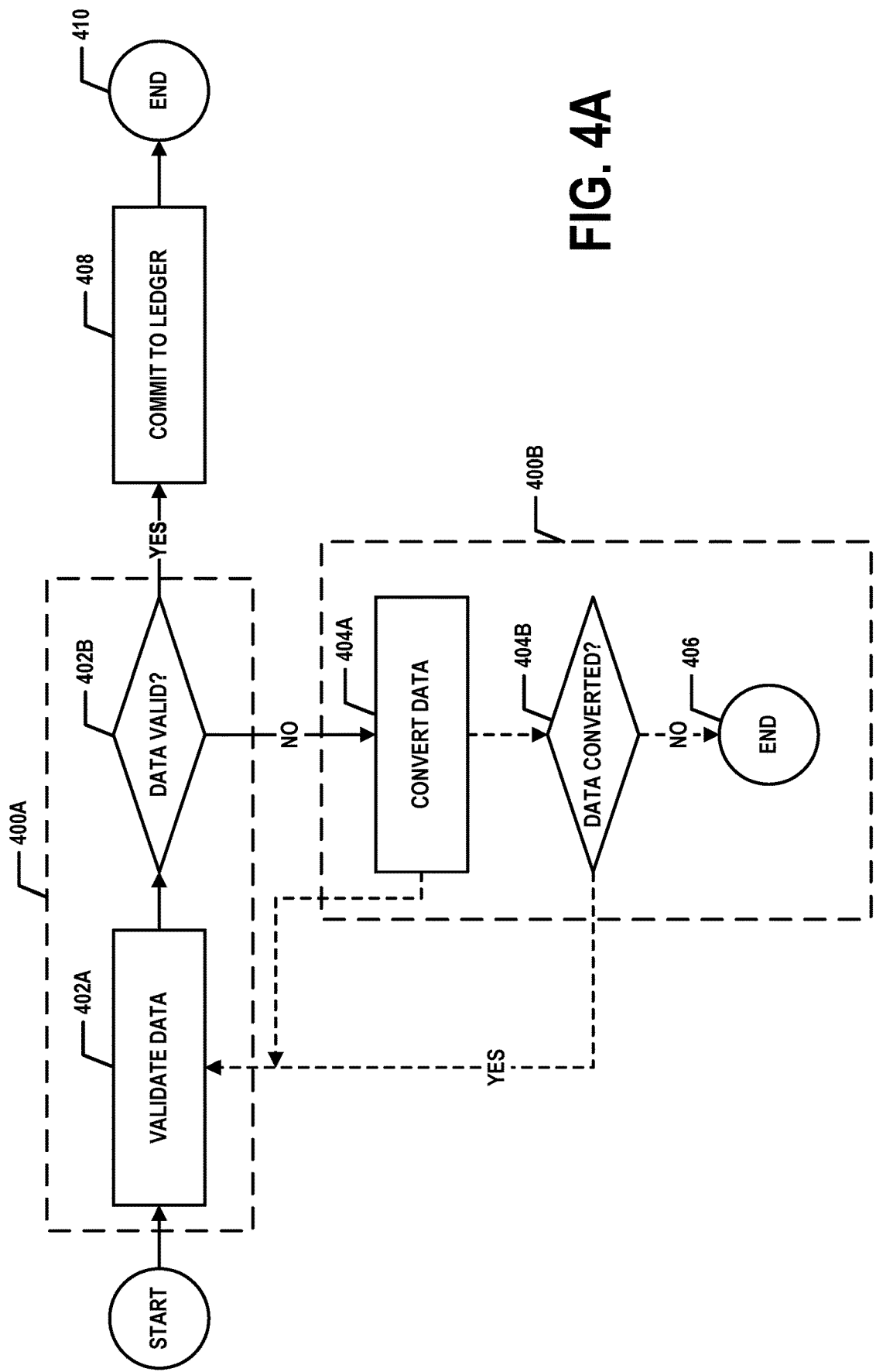
Figure 4B:
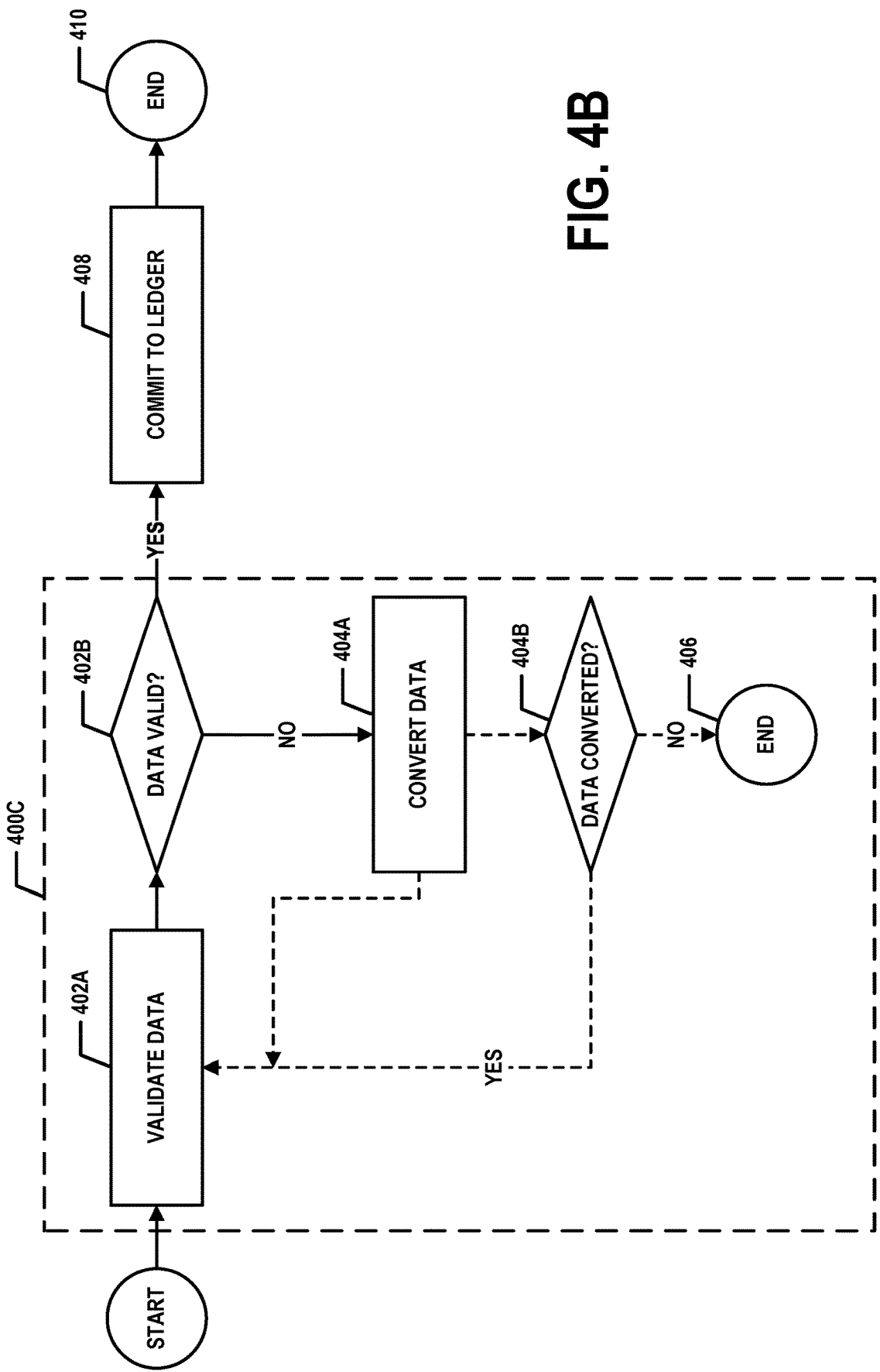

In one embodiment, one or more self-executing smart contracts can be used to validate and/or convert information/data in a candidate transaction. In the embodiment of FIG. 4A, two separate smart contracts are used to validate and/or convert information/data of a candidate transaction for compliance with an information/data standard: validation smart contract 400A and conversion smart contract 400B. In the embodiment of FIG. 4B, one smart contract is used to validate and/or convert information/data of a candidate transaction for compliance with an information/data standard: validation and conversion smart contract 400C. Because a smart contract is a collection of self-executing code, the smart contract can automatically execute the appropriate steps to validate and/or convert information/data. For example, a smart contract can perform calculations, execute validations, perform conversions, enforce contractual terms, store information/data, and automatically send funds to other accounts. The following describes exemplary processes, operations, and/or steps for the same.

a. Data Validation

In one embodiment, the steps/operations performed as 402A of FIGS. 4A and 4B are represented in more detail in FIG. 5. These steps/operations can be performed at a transaction level, field level, and/or the like. To perform these steps/operations, a node computing entity 200, 200' (executing validation smart contract 400A and/or validation and conversion smart contract 400C) receives a candidate transaction, such as candidate patient resource record 800 of FIG. 8 and/or candidate patient resource record 900 of FIG. 9.

After receiving the candidate transaction, the node computing entity 200, 200' (executing validation smart contract 400A and/or validation and conversion smart contract 400C) can determine whether all required data fields for the received type of transaction are present in the candidate transaction (step/operation 502 of FIG. 5). As previously indicated, the required data fields may apply to all transactions or to specific transactions based on transaction types. Using FHIR as an example information/data standard, patient resource records may have a first set of required data fields, and observation records may have a second set of required data fields—both defined by the FHIR standard. Thus, if a patient resource record is received, the node computing entity 200, 200' can determine whether all required patient resource record fields are present in the candidate transaction. Example required data fields of a patient resource record are shown in FIG. 7.

Responsive to the node computing entity 200, 200' (executing validation smart contract 400A and/or validation and conversion smart contract 400C) determining that all required data fields are present in the candidate transaction (e.g., by iteratively checking each field in the candidate transaction), the process proceeds to step/operation 506 of FIG. 5. For instance, if the node computing entity 200, 200' (executing validation smart contract 400A and/or validation and conversion smart contract 400C) receives candidate patient resource record 800 of FIG. 8 and determines that all required data fields are present in the candidate patient resource record 800, the process proceeds to step/operation 506 of FIG. 5.

However, responsive to the node computing entity 200, 200' (executing validation smart contract 400A and/or validation and conversion smart contract 400C) determining that one or more required data fields are not present in the candidate transaction, the process proceeds to step/operation 504 of FIG. 5. At step/operation 504 of FIG. 5, the node computing entity 200, 200' (executing validation smart contract 400A and/or validation and conversion smart contract 400C) can flag each required data field that is not present in the candidate transaction and/or flag the candidate transaction as being invalid. For example, assuming "gender" is a required data field for candidate patient resource records and candidate patient resource record 900 of FIG. 9 is received, the node computing entity 200, 200' can flag "gender" as missing from the patient resource record 900 and/or flag the patient resource record 900 as being invalid. The node computing entity 200, 200' (executing validation smart contract 400A and/or validation and conversion smart contract 400C) would similarly flag any other required data fields that are not present in the candidate transaction. After completing step/operation 504 of FIG. 5, the process proceeds to step/operation 506 of FIG. 5.

At step/operation 506 of FIG. 5, the node computing entity 200, 200' (executing validation smart contract 400A and/or validation and conversion smart contract 400C) can determine whether all remaining fields present in the candidate transaction are allowed optional data fields. As with the required data fields, the optional data fields may apply to all transactions or to specific transactions based on transaction types. Continuing with the FHIR example, patient resource records may have a first set of optional data fields, and an observation record may have a second set of optional data fields. Optional data fields may be data fields that are allowed to be in a candidate transaction, but are not required to be present.

Responsive to the node computing entity 200, 200' (executing validation smart contract 400A and/or validation and conversion smart contract 400C) determining that all remaining fields present in the candidate transaction are allowed optional data fields, (e.g., by iteratively checking each remaining field in the candidate transaction), the process proceeds to step/operation 510 of FIG. 5. For instance, if the node computing entity 200, 200' (executing validation smart contract 400A and/or validation and conversion smart contract 400C) receives candidate patient resource record 800 of FIG. 8 and determines that all remaining fields present in the candidate transaction are allowed optional data fields, the process proceeds to step/operation 510 of FIG. 5.

However, responsive to the node computing entity 200, 200' (executing validation smart contract 400A and/or validation and conversion smart contract 400C) determining that one or more of the remaining fields present in the candidate transaction are not allowed optional data fields, the process proceeds to step/operation 508 of FIG. 5. At step/operation 508 of FIG. 5, the node computing entity 200, 200' (executing validation smart contract 400A and/or validation and conversion smart contract 400C) can flag each remaining field that is not an allowed (e.g., valid) optional data field and/or flag the candidate transaction as being invalid. For example, assuming "sex" is not an allowed optional data field for candidate patient resource records and candidate patient resource record 900 of FIG. 9 is received, the node computing entity 200, 200' can flag "sex" as being an unallowed (e.g., valid) optional data field and/or flag the patient resource record 900 as being invalid. The node computing entity 200, 200' (executing validation smart contract 400A and/or validation and conversion smart contract 400C) would similarly flag any other unallowed optional data fields. After completing step/operation 508 of FIG. 5, the process proceeds to step/operation 510 of FIG. 5

At step/operation 510 of FIG. 5, the node computing entity 200, 200' (executing validation smart contract 400A and/or validation and conversion smart contract 400C) can determine whether all required data fields and/or optional data fields are populated with correct data types, data sizes, and/or data ranges. For example, an input type may be required to be an integer, longinteger, real, singlereal, currency, date, datetime, time, timespan, boolean, string, binary, and/or the like. The input size of a string may be limited to 15 characters. And the input range an integer may be required to be in the domain of [0,10000].

Responsive to the node computing entity 200, 200' (executing validation smart contract 400A and/or validation and conversion smart contract 400C) determining that all required data fields and/or optional data fields are populated with correct data types, data sizes, and/or data ranges (e.g., by iteratively checking each field in the candidate transaction), the process proceeds to step/operation 514 of FIG. 5. For instance, if the node computing entity 200, 200' (executing validation smart contract 400A and/or validation and conversion smart contract 400C) receives candidate patient resource record 800 of FIG. 8 and determines that all required data fields and/or optional data fields are populated with correct data types, data sizes, and/or data ranges, the process proceeds to step/operation 514 of FIG. 5. However, responsive to the node computing entity 200, 200' (executing validation smart contract 400A and/or validation and conversion smart contract 400C) determining that all required data fields and/or optional data fields are not populated with correct data types, data sizes, and/or data ranges, the process proceeds to step/operation 512 of FIG. 5. At step/operation 512 of FIG. 5, the node computing entity 200, 200' (executing validation smart contract 400A and/or validation and conversion smart contract 400C) can flag each field that is not populated with a correct data type, data size, and/or data range—such as an integer data type being populated with a string. The node computing entity 200, 200' (executing validation smart contract 400A and/or validation and conversion smart contract 400C) would similarly flag any other fields with incorrect data types, data sizes, and/or data ranges. After completing step/operation 512 of FIG. 5, the process proceeds to step/operation 514.

At step/operation 514 of FIG. 5, the node computing entity 200, 200' (executing validation smart contract 400A and/or validation and conversion smart contract 400C) can determine whether all required data fields and/or optional data fields are populated with information/data in correct formats. For instance, dates may have to follow the "YYYY-MM-DD" format.

Responsive to the node computing entity 200, 200' (executing validation smart contract 400A and/or validation and conversion smart contract 400C) determining that all required data fields and/or optional data fields are populated with information/data in correct formats (e.g., by iteratively checking each remaining field in the candidate transaction), the process then proceeds to step/operation 518 of FIG. 5.

However, responsive to the node computing entity 200, 200' (executing validation smart contract 400A and/or validation and conversion smart contract 400C) determining that one or more required data fields and/or optional data fields are populated with information/data in incorrect formats, the process proceeds to step/operation 516 of FIG. 5. At step/operation 516 of FIG. 5, the node computing entity 200, 200' (executing validation smart contract 400A and/or validation and conversion smart contract 400C) can flag each field in which information/data is in an incorrect format. For example, assuming birthDate is required to be in a "YYYY-MM-DD" format and candidate patient resource record 900 of FIG. 9 is received, the node computing entity 200, 200' can flag the birthDate field as being in an incorrect format and/or flag the patient resource record 900 as being invalid. The node computing entity 200, 200' (executing validation smart contract 400A and/or validation and conversion smart contract 400C) would similarly flag any other fields with information/data in incorrect formats. The process then proceeds to step/operation 518 of FIG. 5.

At step/operation 518 of FIG. 5, the node computing entity 200, 200' (executing validation smart contract 400A and/or validation and conversion smart contract 400C) can determine whether all required data fields and/or optional data fields are populated with information/data in correct contexts, such as being in the correct system (e.g., metric system vs. imperial system). For instance, weights may need to be in kilograms and temperatures may need to be in Celsius.

Responsive to the node computing entity 200, 200' (executing validation smart contract 400A and/or validation and conversion smart contract 400C) determining that all required data fields and/or optional data fields are populated with information/data in correct contexts (e.g., by iteratively checking each remaining field in the candidate transaction), the process proceeds to step/operation 402B of FIGS. 4A and 4B. For instance, if the node computing entity 200, 200' (executing validation smart contract 400A and/or validation and conversion smart contract 400C) receives candidate patient resource record 800 of FIG. 8 and determines that all required data fields and/or optional data fields are populated with information/data in correct formats, the process proceeds to step/operation 402B of FIGS. 4A and 4B.

However, responsive to the node computing entity 200, 200' (executing validation smart contract 400A and/or validation and conversion smart contract 400C) determining that one or more required data fields and/or optional data fields are populated with information/data in incorrect contexts, the process proceeds to step/operation 520 of FIG. 5. At step/operation 520 of FIG. 5, the node computing entity 200, 200' (executing validation smart contract 400A and/or validation and conversion smart contract 400C) can flag each field in which information/data is in an incorrect context.

As will be recognized, the steps/operations of FIG. 5 may be implemented using various alternatives. As one example, each field in the candidate transaction could pass through the steps/operations of FIG. 5 in sequence. For example, a first field could pass through the steps/operations 502-520 of FIG. 5, then a second field could pass through the steps/operations 502-520 of FIG. 5, and so on. Thus, performance of these and similar steps/operations may be adapted to a variety of needs and circumstances.

After completing step/operation 518 or 520 of FIG. 5, the process proceeds to step/operation 402B of FIGS. 4A and 4B. At step/operation 402B of FIGS. 4A and 4B, the node computing entity 200, 200' determines whether a field of the candidate transaction is flagged as invalid and/or whether the candidate transaction is flagged as invalid. Responsive to the node computing entity 200, 200' determining that the candidate transaction is not flagged as invalid, the process proceeds to step/operation 408 of FIG. 4. Continuing with the above example, if the node computing entity 200, 200' receives candidate patient resource record 800 of FIG. 8 and determines that it has not been flagged as invalid (or has been flagged as being valid), the process proceeds to step/operation 408 of FIG. 4. However, responsive to the node computing entity 200, 200' determining that a field of the candidate transaction is flagged as invalid and/or that the candidate transaction is flagged as invalid, the process proceeds to step/operation 404A of FIGS. 4A and 4B. In the above example, if the node computing entity 200, 200' (executing validation smart contract 400A and/or validation and conversion smart contract 400C) receives candidate patient resource record 900 of FIG. 9 and determines that it has been flagged as invalid, (or has not been flagged as being valid), the process proceeds to step/operation 404A of FIGS. 4A and 4B.

b. Data Conversion

In one embodiment, the steps/operations performed as 404A of FIGS. 4A and 4B are represented in more detail in FIGS. 6A and 6B. The steps/operations can be performed at a transaction level, field level, and/or the like. To perform these steps/operations, a node computing entity 200, 200' (executing conversion smart contract 400B and/or validation and conversion smart contract 400C) receives the flagged candidate transaction that has had one or more fields flagged as invalid and/or as having had the candidate transaction flagged as invalid, such as candidate patient resource record 900 of FIG. 9.

After receiving the flagged candidate transaction, the node computing entity 200, 200' (executing conversion smart contract 400B and/or validation and conversion smart contract 400C) can iteratively attempt to convert unallowed optional data fields to missing required data fields (steps/operations 602, 602A, and 604 of FIG. 6A)—if applicable. In one embodiment, this step/operation may be performed first since a missing required field would not allow the transaction ever be valid unless another field were correspondingly converted. Continuing with the above example, "gender" is a required data field for candidate patient resource records and has been flagged as missing in candidate patient resource record 900 of FIG. 9. Thus, the node computing entity 200, 200' can attempt to convert unallowed optional data fields to the missing required data field for "gender." To do so, the node computing entity 200, 200' (executing conversion smart contract 400B and/or validation and conversion smart contract 400C) can identify all unallowed optional data fields that have been flagged and attempt to convert them to missing required data fields. In another embodiment, the node computing entity 200, 200' can also identify all allowed optional data fields and attempt to convert them to missing required data fields. In the above example, the only unallowed optional data field that has been flagged in candidate patient resource record 900 of FIG. 9 is "sex."

After identifying the unallowed optional data fields that have been flagged, the node computing entity 200, 200' can retrieve or access a required data field conversion object for the missing required data field under consideration in the iteration. For example, FIG. 10 shows an exemplary required data field conversion object 1000 for the missing required data field for "gender." In this example, the required data field conversion object 1000 identifies terms/fields that may be considered as equivalent to the required data field for "gender." Using the terms/fields listed in the required data field conversion object, the node computing entity 200, 200' can require a direct match for conversion, such as requiring any of the terms/fields listed in the required data field conversion object to match exactly with an unallowed optional data field. In other embodiments, the node computing entity 200, 200' can implement different approaches for matching terms/fields listed in the required data field conversion object with unallowed optional data fields. For example, the node computing entity 200, 200' can use fuzzy matching, similarity scores, and/or the like to determine whether an unallowed optional data field is sufficiently similar to a term/field listed in a required data field conversion object to allow for conversion of the same to a missing required data field. Continuing with the above example, because "sex" is listed as an equivalent term/field in the required data field conversion object 1000, the node computing entity 200, 200' can convert the unallowed optional data field for "sex" to the required data field for "gender." In this example, the node computing entity 200, 200' may simply rename the unallowed optional data field for "sex" to "gender." As will be recognized, a variety of other approaches and techniques can be used to adapt to various needs and circumstances. FIG. 12 shows patient resource record 900 having the unallowed optional data field for "sex" converted to the required data field for "gender" in patient resource record 1200. Further, the candidate transaction (e.g., candidate resource record 1200 in FIG. 12) complies with the information/data standard.

In one embodiment, if a required data field is missing and cannot be converted from an unallowed optional data field (or an allowed data field), the process ends (step/operation 602A of FIG. 6A) since the candidate transaction cannot be committed to the ledger as it will not comply with the information/data standard being enforced. If a missing required data field is converted, the node computing entity

200, 200' (executing conversion smart contract 400B and/or validation and conversion smart contract 400C) can iterate through and attempt to convert any other unallowed optional data fields to any remaining missing required data fields (step/operation 604 of FIG. 6A). This iteration can continue until all required data fields exist or until the process ends because a required data field is missing and cannot be converted from an unallowed optional data field. As will be recognized, these steps/operations ensure that a candidate transaction has all required data fields present. If all required data fields are present, the process continues to step/operation 606 of FIG. 6A.

In step/operation 606 of FIG. 6A, the node computing entity 200, 200' (executing conversion smart contract 400B and/or validation and conversion smart contract 400C) can iteratively attempt to correct any incorrect data types in required data fields that have been flagged as invalid (steps/operations 606, 606A, and 608 of FIG. 6A)—if applicable. To do so, the node computing entity 200, 200' can retrieve or access a type conversion object (not shown) for a required data field flagged as having an incorrect data type. Using the type conversion object for the required data field under consideration in the iteration, the node computing entity 200, 200' may be able to convert the incorrect data type of the required data field to the correct data type, such as converting a currency to an integer, a datetime to a time, a string to an integer, and/or the like. In one embodiment, if an incorrect data type of a required data field cannot be converted to the correct data type, the process ends (step/operation 606A of FIG. 6A) since the candidate transaction cannot be committed to the ledger as it will not comply with the information/data standard being enforced. If an incorrect data type is properly converted, the node computing entity 200, 200' (executing conversion smart contract 400B and/or validation and conversion smart contract 400C) can iterate through and attempt to convert any other incorrect data types in other flagged required data fields (step/operation 608 of FIG. 6A). This iteration can continue until all required data fields have correct data types or until the process ends because a required data field data type cannot be converted to a correct data type. As will be recognized, these steps/operations ensure that all required data fields for a candidate transaction are of the correct data type. If all required data fields are of a correct data type, the process continues to step/operation 610 of FIG. 6A.

In step/operation 610 of FIG. 6A, the node computing entity 200, 200' (executing conversion smart contract 400B and/or validation and conversion smart contract 400C) can iteratively attempt to correct any incorrect information/data formats in required data fields that have been flagged as invalid (steps/operations 610, 610A, and 612 of FIG. 6A)— if applicable. To do so, the node computing entity 200, 200' can retrieve or access a context/format conversion object for a required data field flagged as having an incorrect information/data format, such as context/format conversion object 1100 of FIG. 11. Using the context/format conversion object for the required data field under consideration in the iteration, the node computing entity 200, 200' may be able to convert the incorrect information/data format of the required data field to the correct information/data format. Continuing with the example of patient resource record 900, the required data field for birthDate must be in the "YYYY-MM-DD" format. However, date of birth in patient resource record 900 is in the "YYYY.MM.DD" format. Thus, using context/format conversion object 1100, the node computing entity 200, 200' can convert the "YYYY.MM.DD" format to the "YYYY-MM-DD." In this example, then, the date of birth "1974.12.25" in the required birthDate field is converted to "1974-12-25." In one embodiment, if an incorrect information/data format of a required data field cannot be converted to the correct information/data format, the process ends (step/operation 610A of FIG. 6A) since the candidate transaction cannot be committed to the ledger as it will not comply with the information/data standard being enforced. If an incorrect information/data format is properly converted, the node computing entity 200, 200' (executing conversion smart contract 400B and/or validation and conversion smart contract 400C) can iterate through and attempt to convert any other incorrect formats in other flagged required data fields (step/operation 612 of FIG. 6A). This iteration can continue until all required data fields have correct formats or until the process ends because a required data field information/data format cannot be converted to a correct information/data format. As will be recognized, these steps/operations ensure that all required data fields for a candidate transaction are in the correct information/data format. If all required data fields are in the correct information/data format, the process continues to step/operation 613 of FIG. 6A.

In step/operation 613 of FIG. 6A, the node computing entity 200, 200' (executing conversion smart contract 400B and/or validation and conversion smart contract 400C) can iteratively attempt to correct any incorrect information/data contexts in required data fields that have been flagged as invalid (steps/operations 613, 613A, and 614 of FIG. 6A)— if applicable. To do so, the node computing entity 200, 200' can retrieve or access a context/format conversion object for a required data field flagged as having an incorrect information/data context, such as context/format conversion object 1100 of FIG. 11. Using the context/format conversion object for the required data field under consideration in the iteration, the node computing entity 200, 200' may be able to convert the incorrect information/data context of the required data field to the correct information/data context. While not shown, this may include converting kilograms to pounds, feet to meters, Celsius to Fahrenheit, and/or the like. In one embodiment, if an incorrect information/data context of a required data field cannot be converted to the correct information/data context, the process ends (step/operation 613A of FIG. 6A) since the candidate transaction cannot be committed to the ledger as it will not comply with the information/data standard being enforced. If an incorrect information/data context is properly converted, the node computing entity 200, 200' (executing conversion smart contract 400B and/or validation and conversion smart contract 400C) can iterate through and attempt to convert any other incorrect contexts in other flagged required data fields (step/operation 614 of FIG. 6A). This iteration can continue until all required data fields have correct contexts or until the process ends because a required data field information/data context cannot be converted to a correct information/data context. As will be recognized, these steps/operations ensure that all required data fields for a candidate transaction are in the correct information/data context. If all required data fields are in the correct information/data context, the process continues to step/operation 615 of FIG. 6B.

In step/operation 615 of FIG. 6B, the node computing entity 200, 200' (executing conversion smart contract 400B and/or validation and conversion smart contract 400C) can iteratively attempt to convert unallowed optional data fields to allowed optional data fields (steps/operations 615, 615A, and 616 of FIG. 6B)—if applicable. To do so, the node computing entity 200, 200' can retrieve or access an optional data field conversion object (not shown) based on the name of the unallowed optional data field under consideration in the iteration. Using the term/field of the unallowed optional data field, the node computing entity 200, 200' can require a direct match to a corresponding optional data field conversion object. If a direct match is found, the node computing entity 200, 200' can convert the unallowed optional data field to the matched allowed optional data field. As described above, in other embodiments, the node computing entity 200, 200' can implement different approaches for matching terms/fields, such as fuzzy matching, similarity scores, and/or the like. In one embodiment, if an unallowed optional data field cannot be converted to an allowed optional data field, the unallowed optional data field is removed from the candidate transaction (step/operation 615A of FIG. 6B) so the candidate transaction will comply with the information/data standard being enforced. Alternatively, the process can end. If an unallowed optional data field is converted, the node computing entity 200, 200' (executing conversion smart contract 400B and/or validation and conversion smart contract 400C) can iterate through and attempt to convert any other unallowed optional data fields to allowed optional data fields (step/operation 616 of FIG. 6B). This iteration can continue until all unallowed optional data fields are converted to allowed optional data fields or until all unallowed optional data fields have been removed from the candidate transaction. As will be recognized, these steps/operations ensure that all optional data fields of a candidate transaction are only allowed optional data fields. Then, the process continues to step/operation 618 of FIG. 6B.

In step/operation 618 of FIG. 6B, the node computing entity 200, 200' (executing conversion smart contract 400B and/or validation and conversion smart contract 400C) can iteratively attempt to correct any incorrect data types in optional data fields that have been flagged as invalid (steps/operations 618, 618A, and 620 of FIG. 6B)—if applicable. To do so, the node computing entity 200, 200' can retrieve or access a type conversion object (not shown) for an optional data field flagged as having an incorrect data type. Using the type conversion object for the optional data field under consideration in the iteration, the node computing entity 200, 200' may be able to convert the incorrect data type of the optional data field to the correct data type, such as converting a currency to an integer, a datetime to a time, a string to an integer, and/or the like. In one embodiment, if an incorrect data type of an optional data field cannot be converted to the correct data type, the optional data field is removed from the candidate transaction (step/operation 615A of FIG. 6B) so the candidate transaction will comply with the information/data standard being enforced. Alternatively, the process can end. If an incorrect data type is properly converted, the node computing entity 200, 200' (executing conversion smart contract 400B and/or validation and conversion smart contract 400C) can iterate through and attempt to convert any other incorrect data types in other flagged optional data fields (step/operation 620 of FIG. 6B). This iteration can continue until all optional data fields have correct data types or until all optional data fields with incorrect data types have been removed from the candidate transaction. As will be recognized, these steps/operations ensure that all optional data fields for a candidate transaction are of the correct data type. Then, the process continues to step/operation 622 of FIG. 6B.

In step/operation 622 of FIG. 6B, the node computing entity 200, 200' (executing conversion smart contract 400B and/or validation and conversion smart contract 400C) can iteratively attempt to correct any incorrect formats in optional data fields that have been flagged as invalid (steps/operations 622, 622A, and 624 of FIG. 6B)—if applicable. To do so, the node computing entity 200, 200' can retrieve or access a context/format conversion object for an optional data field flagged as having an incorrect information/data format (similar to context/format conversion object 1100 of FIG. 11). Using the format conversion object for the optional data field under consideration in the iteration, the node computing entity 200, 200' may be able to convert the incorrect information/data format of the optional data field to the correct information/data format. In one embodiment, if an incorrect information/data format of an optional data field cannot be converted to the correct information/data format, the optional data field is removed from the candidate transaction (step/operation 622A of FIG. 6B) so the candidate transaction will comply with the information/data standard being enforced. Alternatively, the process can end. If an incorrect information/data format is properly converted, the node computing entity 200, 200' (executing conversion smart contract 400B and/or validation and conversion smart contract 400C) can iterate through and attempt to convert any other incorrect information/data formats in other flagged optional data fields (step/operation 624 of FIG. 6B). This iteration can continue until all optional data fields have correct information/data formats or until all optional data fields with incorrect information/data formats have been removed from the candidate transaction. As will be recognized, these steps/operations ensure that all optional data fields for a candidate transaction have correct information/data formats. The process then proceeds to step/operation 626 of FIG. 6B.

In step/operation 626 of FIG. 6B, the node computing entity 200, 200' (executing conversion smart contract 400B and/or validation and conversion smart contract 400C) can iteratively attempt to correct any incorrect contexts in optional data fields that have been flagged as invalid (steps/operations 626, 626A, and 628 of FIG. 6B)—if applicable. To do so, the node computing entity 200, 200' can retrieve or access a context/format conversion object for an optional data field flagged as having an incorrect information/data context (similar to context/format conversion object 1100 of FIG. 11). Using the context/format conversion object for the optional data field under consideration in the iteration, the node computing entity 200, 200' may be able to convert the incorrect information/data context of the optional data field to the correct information/data context. In one embodiment, if an incorrect information/data context of an optional data field cannot be converted to the correct information/data context, the optional data field is removed from the candidate transaction (step/operation 626A of FIG. 6B) so the candidate transaction will comply with the information/data standard being enforced. Alternatively, the process can end. If an incorrect information/data context is properly converted, the node computing entity 200, 200' (executing conversion smart contract 400B and/or validation and conversion smart contract 400C) can iterate through and attempt to convert any other incorrect information/data contexts in other flagged optional data fields (step/operation 628 of FIG. 6B). This iteration can continue until all optional data fields have correct information/data contexts or until all optional data fields with incorrect information/data contexts have been removed from the candidate transaction. As will be recognized, these steps/operations ensure that all optional data fields for a candidate transaction have correct information/data contexts.

As will be recognized, the steps/operations of FIGS. 6A and/or 6B may be implemented using various alternatives. As one example, each field in the candidate transaction could pass through the steps/operations of FIGS. 6A and/or 6B in sequence. For example, a first field could pass through the steps/operations of FIGS. 6A and/or 6B, then a second field could pass through the steps/operations of FIGS. 6A and/or 6B, and so on. Thus, performance of these and similar steps/operations may be adapted to a variety of needs and circumstances.

Then, the process optionally returns the converted candidate transaction to step/operation 402A of FIGS. 4A and 4B or optionally proceeds to step/operation 404B of FIGS. 4A and 4B. For instance, the node computing entity 200, 200' can return the converted candidate resource record 1200 in FIG. 12 to step/operation 402A of FIGS. 4A and 4B for revalidation or can proceed to step/operation 404B of FIGS. 4A and 4B. At step/operation 402A of FIGS. 4A and 4B, the converted candidate transaction is revalidated as previously described. At step/operation 404B of FIGS. 4A and 4B, the node computing entity 200, 200' can determine whether at least one aspect of the candidate transaction was converted. If at least one aspect of the candidate transaction was converted, the converted candidate transaction is returned to step/operation 402A of FIGS. 4A and 4B for revalidation as previously described. If at least one aspect of the candidate transaction was not converted, the process ends (step/operation 406 of FIGS. 4A and 4B) as the candidate transaction is not valid and cannot be converted.

As a result of revalidation, the process may continue to step/operation 408 of FIGS. 4A and 4B or through for additional conversion if a field or the converted candidate transaction is flagged again (e.g., the gender field that was converted may not have been in the correct type or may not have been in the correct format/context). This revalidation ensures that the converted candidate transaction is in compliance with the information/data standard. Alternatively, because the steps/operations of FIGS. 4A, 4B, 5, 6A, and 6B are exemplary (not required), the process can continue to step/operation 404B of FIGS. 4A and 4B.

c. Transaction Commission

In one embodiment, step/operation 408 of FIGS. 4A and 4B occurs as a result of a validated candidate transaction being submitted initially. For example, such as candidate patient resource record 800 of FIG. 8 being initially submitted. In another embodiment, step/operation 408 of FIGS. 4A and 4B occurs as a result of a converted candidate transaction being validated. For instance, such as candidate patient resource record 900 of FIG. 9 being converted to converted candidate patient resource record 1200 of FIG. 12 from one or more iterations of the steps/operations of FIGS. 4A, 4B, 5, 6A, and 6B.

At step/operation 408 of FIGS. 4A and 4B, the validated candidate transaction is committed to the distributed ledger. In the blockchain context, the validated candidate transaction is stored as a committed transaction in a block. Continuing with the above example, validated candidate resource record 800 of FIG. 8 is committed to the distributed ledger (e.g., blockchain) and is stored in a block as committed resource record 800. Similarly, validated candidate resource record 1200 of FIG. 12 is committed to the distributed ledger (e.g., blockchain) and is stored in a block as committed resource record 1200. At this point, the process ends (step/operation 410 of FIGS. 4A and 4B).

V. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for execution in a distributed ledger system, the method comprising:
receiving, by a node computing entity in the distributed ledger system, a request to commit a candidate transaction to a distributed ledger in the distributed ledger system;
responsive to receiving the candidate transaction, automatically executing, by the node computing entity in the distributed ledger system, a validation smart contract to validate at least a portion of the data in the candidate transaction, wherein validating the at least a portion of the data comprises at least one of determining (1) whether a first data format is a required data format, or (2) whether a second data field is an allowed optional data field, and wherein:
in an instance in which validating the at least a portion of the data comprises determining whether a second data format is a required data format, the candidate transaction comprises a first data field, the first data field is in a first data format, the required data format is a second data format, a data standard defines the required data format, and the validation smart contract comprises self-executing program code, or
in an instance in which validating the at least a portion of the data comprises determining whether a second data field is an allowed optional data field, the candidate transaction comprises the second data field, a data standard defines a plurality of allowed optional data fields, and the validation smart contract comprises self-executing program code;
responsive to at least one of determining that (1) the first data format is not the required data format, or (2) the second data field is not an allowed optional data field, flagging, by the node computing entity in the distributed ledger system, at least one of the first data field, the second data field, or candidate transaction as invalid; and
automatically executing, by the node computing entity in the distributed ledger system, a conversion smart contract to convert at least one of (1) the first data format to the second data format, or (2) the second data field to an allowed optional data field, wherein the conversion smart contract comprises self-executing program code.

2. The method of claim 1, wherein automatically executing the conversion smart contract to convert the first data format to the second data format generates a converted candidate transaction.

3. The method of claim 2 further comprising:
automatically executing the validation smart contract to validate at least a portion of the data in the converted candidate transaction; and
committing the converted candidate transaction to the distributed ledger.

4. The method of claim 1, wherein the validation smart contract and the conversion smart contract comprise the same smart contract.

5. The method of claim 1, wherein the first data field is of a first data type, validating the at least the portion of the data in the candidate transaction comprises determining whether the first data type is a required data type, the required data type is a second data type, and the data standard defines the required data type,
responsive to determining that the first data type is not the required data type, flagging at least one of the first data field, or the candidate transaction as invalid; and
automatically executing the conversion smart contract to convert the first data type to the second data type, wherein the conversion smart contract comprises self-executing program code.

6. A node in a distributed ledger system, the node comprising at least one processor and at least one memory including program code, the at least one memory and the program code configured to, with the processor, cause the node to at least:
receive a request to commit a candidate transaction to a distributed ledger in the distributed ledger system;
responsive to receiving the candidate transaction, automatically execute a validation smart contract to validate at least a portion of the data in the candidate transaction, wherein validating the at least a portion of the data comprises at least one of determining (1) whether a first data format is a required data format, or (2) whether a second data field is an allowed optional data field, and wherein:
in an instance in which validating the at least a portion of the data comprises determining whether a second data format is a required data format, the candidate transaction comprises a first data field, the first data field is in a first data format, the required data format is a second data format, a data standard defines the required data format, and the validation smart contract comprises self-executing program code, or
in an instance in which validating the at least a portion of the data comprises determining whether a second data field is an allowed optional data field, the candidate transaction comprises the second data field, a data standard defines a plurality of allowed optional data fields, and the validation smart contract comprises self-executing program code;
responsive to at least one of determining that (1) the first data format is not the required data format, or (2) the second data field is not an allowed optional data field, flag at least one of the first data field, the second data field, or candidate transaction as invalid; and
automatically execute a conversion smart contract to convert at least one of (1) the first data format to the second data format, or (2) the second data field to an allowed optional data field, wherein the conversion smart contract comprises self-executing program code.

7. The node of claim 6, wherein automatically executing the conversion smart contract to convert the first data format to the second data format generates a converted candidate transaction.

8. The node of claim 7, wherein the memory and program code are further configured to, with the processor, cause the node to:
automatically execute the validation smart contract to validate at least a portion of the data in the converted candidate transaction; and
commit the converted candidate transaction to the distributed ledger.

9. The node of claim 6, wherein the validation smart contract and the conversion smart contract comprise the same smart contract.

10. The node of claim 6, wherein the first data field is of a first data type, validating the at least the portion of the data in the candidate transaction comprises determining whether the first data type is a required data type, the required data type is a second data type, and the data standard defines the required data type, and wherein the memory and program code are further configured to, with the processor, cause the node to:
responsive to determining that the first data type is not the required data type, flag at least one of the first data field, or the candidate transaction as invalid; and
automatically execute the conversion smart contract to convert the first data type to the second data type, wherein the conversion smart contract comprises self-executing program code.

11. A computer program product for execution by a node in a distributed ledger system, the computer program product comprising at least one non-transitory computer-readable storage medium having computer-readable program code portions stored therein, the computer-readable program code portions comprising:
an executable portion configured to receive a request to commit a candidate transaction to a distributed ledger in the distributed ledger system;
an executable portion configured to, responsive to receiving the candidate transaction, automatically execute a validation smart contract to validate at least a portion of the data in the candidate transaction, wherein validating the at least a portion of the data comprises at least one of determining (1) whether a first data format is a required data format, or (2) whether a second data field is an allowed optional data field, and wherein:
in an instance in which validating the at least a portion of the data comprises determining whether a second data format is a required data format, the candidate transaction comprises a first data field, the first data field is in a first data format, the required data format is a second data format, a data standard defines the required data format, and the validation smart contract comprises self-executing program code, or
in an instance in which validating the at least a portion of the data comprises determining whether a second data field is an allowed optional data field, the candidate transaction comprises the second data field, a data standard defines a plurality of allowed optional data fields, and the validation smart contract comprises self-executing program code;
an executable portion configured to, responsive to at least one of determining that (1) the first data format is not the required data format, or (2) the second data field is not an allowed optional data field, flag at least one of the first data field, the second data field, or candidate transaction as invalid; and
an executable portion configured to automatically execute a conversion smart contract to convert at least one of (1) the first data format to the second data format, or (2) the second data field to an allowed optional data field, wherein the conversion smart contract comprises self-executing program code.

12. The computer program product of claim 11, wherein automatically executing the conversion smart contract to convert the first data format to the second data format generates a converted candidate transaction.

13. The computer program product of claim 12 further comprising:
- an executable portion configured to automatically execute the validation smart contract to validate at least a portion of the data in the converted candidate transaction; and
- an executable portion configured to commit the converted candidate transaction to the distributed ledger.

14. The computer program product of claim 11, wherein the validation smart contract and the conversion smart contract comprise the same smart contract.

15. The computer program product of claim 11, wherein the first data field is of a first data type, validating the at least the portion of the data in the candidate transaction comprises determining whether the first data type is a required data type, the required data type is a second data type, and the data standard defines the required data type, and wherein the computer program product further comprises:
- an executable portion configured to, responsive to determining that the first data type is not the required data type, flag at least one of the first data field, or the candidate transaction as invalid; and
- an executable portion configured to automatically execute the conversion smart contract to convert the first data type to the second data type, wherein the conversion smart contract comprises self-executing program code.

\* \* \* \* \*